(12) United States Patent
McKenna

(10) Patent No.: US 6,679,127 B2
(45) Date of Patent: Jan. 20, 2004

(54) DOUBLE-ENDED LOAD CELL AND METHOD OF MOUNTING SAME

(76) Inventor: Paul A. McKenna, 7, 3600-19 Street NE., Calgary (CA), T2E 6V2

( * ) Notice: Subject to any disclaimer, the term of this patent is extended or adjusted under 35 U.S.C. 154(b) by 203 days.

(21) Appl. No.: 09/935,977

(22) Filed: Aug. 23, 2001

(65) Prior Publication Data

US 2002/0069708 A1 Jun. 13, 2002

(30) Foreign Application Priority Data

Aug. 24, 2000 (CA) ............................................. 2316660

(51) Int. Cl.[7] ................. G01L 1/04; G01L 1/22
(52) U.S. Cl. ................. 73/862.637; 73/862.631; 73/862.632
(58) Field of Search ................. 73/862.637, 862.631, 73/862.632, 862.633, 862.634, 862.635, 862.636, 862.641

(56) References Cited

U.S. PATENT DOCUMENTS

| | | | |
|---|---|---|---|
| 3,827,514 A | * | 8/1974 | Bradley ...................... 177/147 |
| 3,879,998 A | | 4/1975 | Bradley |
| 4,312,241 A | * | 1/1982 | Budraitis ............... 73/862.325 |
| 4,558,756 A | * | 12/1985 | Seed .......................... 177/211 |
| 5,224,561 A | * | 7/1993 | Ahl ............................ 177/163 |
| 5,419,210 A | * | 5/1995 | Haker .................. 73/862.631 |

FOREIGN PATENT DOCUMENTS

JP 60040930 A * 3/1985 ............. G01L/1/22

* cited by examiner

*Primary Examiner*—Edward Lefkowitz
*Assistant Examiner*—Lilybett Martir
(74) *Attorney, Agent, or Firm*—Howard J. Greenwald P.C.

(57) ABSTRACT

A load cell has a beam where the beam receives a weight to be measured radial to the longitudinal axis. The force of the weight is received on a load section on the beam and the force is measured by at least one force-reacting section on the beam. The load section has a greater diameter thickness than that of the force-reacting section, which allows certain advantages including a reduction in the profile of the load cell.

6 Claims, 26 Drawing Sheets

DOUBLE-ENDED LOAD CELL AND METHOD OF MOUNTING SAME

FIELD OF INVENTION

This invention relates to load cells and in particular to an improved double-ended, centre-loaded beam-type load cell for measuring force and the method in which such a load cell is mounted.

BACKGROUND OF THE INVENTION

It is common to construct load cells in a double-ended beam configuration, and to utilize electrical strain gages which are installed upon surfaces of the beam in various configurations to measure the strain occurring in such a beam under an applied force. The purpose of the strain gages is to respond to changes in the force-induced strain and to provide, when connected in the commonly used Wheatstone bridge circuit, a change in electrical output signal representative of a change in force applied to the load cell. Such arrangements are well known in the art.

U.S. Pat. No. 3,879,998 (Bradley) discloses a double-ended beam load cell which utilizes strain gages which are mounted and are electrically connected in a differential-moment configuration. This load cell is constructed of a beam of constant diameter, and therefore requires the use of fabricated force-receiving mounting parts which are externally clamped onto the load cell. Such force-receiving mounting sections are relatively bulky, tall, and heavy, as well as somewhat expensive to construct. Also, due to their being locked to the beam, unwanted strains may be induced within the load cell through imperfect mounting tolerances causing torsion and/or longitudinal couples to be applied to the load cell, which reduces measurement accuracy. Although the strain gages are generally configured in a way so as to cancel such unwanted extraneous forces, such cancellation is rarely perfect due to small misalignments of the strain gages.

Double-ended beam load cells are also constructed with the well known shear beam strain sensing configuration, such as the "RL75016 double-ended shear beam load cell" from Rice Lake Weighing Systems. The mounting method is similar to that disclosed above, and the same undesirable strains are induced, due to similar undesirable load-receiving mounting sections. As well, the force-receiving mounting parts are also bulky, tall, and heavy, and expensive to construct.

The same problems described above regarding differential-moment and shear-beam double-ended beams also apply to parallelogram-beam double-ended beams. The fundamentals of differential-moment, shear-beam, and parallelogram-beam force-sensing principles are well known in prior art.

SUMMARY OF THE INVENTION

It is an aspect of an object of the present invention to reduce the vertical height, weight, bulk, and machining cost of a load cell and related mounting components.

It is an aspect of a further object of the present invention to provide a strain gage load cell with a simplified mounting method.

It is an aspect of a further object of the present invention to provide a load cell with a lower-cost mounting method.

It is an aspect of a further object of the present invention to provide a load cell and mount which is lower in height.

It is an aspect of a further object of the present invention to provide a load cell and mount which together and separately are lower in bulk and weight.

It is an aspect of the present invention to provide a load cell that can more easily be mounted using commonly available link components (such as those manufactured by The Crosby Group of USA, "Grade 8 Alloy Fittings", Page 131, The Crosby Group.).

It is an aspect of the present invention to provide a load cell for use in a reciprocating-motion oil well, in which the sum of the weight and the vertical forces acting upon a down-hole rod string, are supported by and therefore may be measured by the load cell.

It is an aspect of the present invention to provide a load cell with alternative mounting methods which utilize bearings or bushings for a more repeatable and durable wear of usage in the rotational directions accorded to each bearing's employment, which is of benefit in typical installations such as truck-borne tipping gear (dump bodies), so as to provide a fully supporting, self-hinging, load weighing assembly.

It is an aspect of the present invention to provide a load cell with a centre load-receiving section with a centre diameter which is substantially greater than the diameter of the force-reacting sections, and which centre diameter is large enough to allow a hole for a pin of sufficient load-carrying capacity with respect to the capacity of the load cell to be machined through the centre force receiving section.

It is an aspect of the present invention to provide a load cell with pin-loading, which substantially eliminates the introduction of longitudinal couples due to allowed rotation about the rotational axis of the pin.

It is an aspect of the present invention to provide a load cell having transition areas, along the length of the beam, from the larger diameter middle section, to the smaller-diameter strain-reacting sections, that are gradual in nature in order to reduce stress concentrations in the transition areas.

It is an aspect of the present invention to provide a load cell that can be constructed using differential-moment, parallelogram-beam, or shear-strain sensing methods.

It is an aspect of the present invention to provide a load cell having a longitudinal strength of the load cell body that is large in comparison with the vertical load forces intended to be measured, due to the nature of most materials, such as steel, to have their greatest strength when loaded in compression or tension. This is consistent with parallelogram-beam, shear-beam, and differential-moment-beam load cells.

It is an aspect of the present invention to provide clearance distances in a longitudinal direction between a load cell and each end mounting member that are sufficient as to overcome the longitudinal displacement due to thermal or other incidental and normal expansion of adjoining structures such as foundations, mounted containers, or weigh scale decks.

It is an aspect of the present invention to provide a method of mounting adjacent load cells where the mounts are mutually angularly orientated away from one another according to the number of load cells employed in an installation. The mutual angular displacements are such that the long axis of the load cell and mount point toward the centre of the supported structure, or may be aligned such that the long axis of the load cell and mounts are tangential to the centre of the supported structure.

It is an aspect of the present invention to provide a method of mounting load cells such that clearance distances between each of the surfaces of any mounting member contacting, resting upon, and loading the pin, are substantially greater than the longitudinal clearances of the preceding paragraph, such that sideways forces applied to the load cells are substantially reduced.

It is an aspect of the present invention to provide mounts which are employed one at each end of the load cell, and which provide supporting surfaces which are concentric with respect to the longitudinal axis of the load cell, which allows the load cell to rotate freely within each mount, thus eliminating the introduction of torsional forces to the load cell. The forces acting upon each end of the pin thus cause the load cell to rotate until the forces are equal at both ends of the pin. In this state of equilibrium, the load cell does not rotate freely with regard to the applied forces. In this way, the load cell's force sensing axis is always aligned with the direction of the applied forces.

It is an aspect of the present invention to provide a method of constructing load cells where a major initial material removal to create the shape of the load cell is by lathe turning, which is fundamentally less costly and more efficient than other machining operations, such as milling. A disadvantage of this is that more overall material may be removed than with other designs, however, with large amounts of recycling of waste material being commonplace in the machining industry, any such loss of material is significantly mitigated.

It is an aspect of the present invention to provide mounts that are preferably made of metal such as steel or aluminum, and may be constructed using either casting or welded fabrication methods, or a combination of both.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The present invention will be further understood from the following detailed description, with reference to the drawings in which.

DETAILED DESCRIPTION

Figure 1:
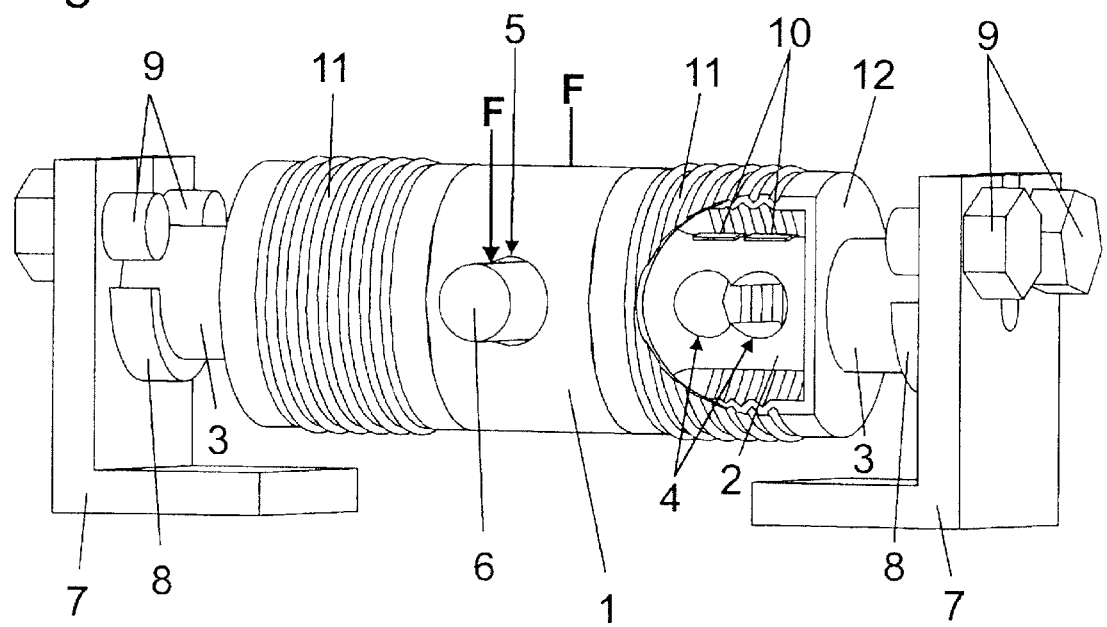
FIG. 1 is a perspective view of a load cell and mounts in accordance with an embodiment of the present invention, with a partial cut-out of housing components.

Referring to the drawings, and initially to FIG. 1, there is a perspective view of a load cell 1 and mounts 7 in accordance with an embodiment of the present invention, with a partial cut-out of housing components. The load cell is in the form of a round beam. Initial major material diminishments are first made to form two reduced-diameter force-reacting sections 2, and two supporting end sections 3. The end sections 3 articulate a supporting element in and of the load cell body. Material diminishments 4 are made passing all the way through the force-reacting sections to create the parallelogram geometry, thus establishing the characteristics of the parallelogram-beam force sensing method. Material diminishments are made horizontally through the centre of the load cell at or near its point of greatest diameter to form a bore 5.

Figure 4:
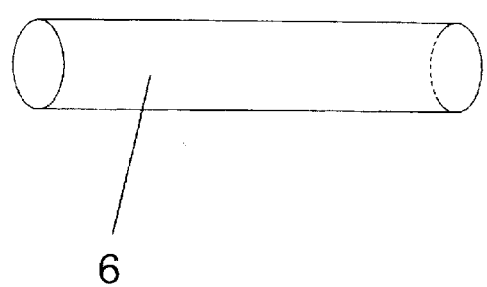
FIG. 4 is a perspective view of a pin of FIG. 1.

A pin 6, as shown in FIG. 4, is inserted through the bore 5 and protrudes from both sides of the load cell 1. Forces to be measured (F) are applied vertically to each end of the pin 6. A plurality of strain gages 10 (such as type N2A-06-S047x-350 manufactured by Vishay Measurements Group Inc. of USA) are installed upon the upper or lower, or upper and lower, surfaces of force-reacting sections 2 and are aligned to respond to longitudinal strain. Electrical connections are made to connect strain gages 10 in a Wheatstone-bridge configuration to provide a measuring circuit with an analog output signal responsive to changes in the applied force.

Transition areas between the greatest-diameter section and the least-diameter sections are preferably filleted. Mounts or supporting structures 7 are constructed of flat rectangular plates which are joined at their ends at right angles. Alternatively, equivalent-shaped supporting structures 7 are formed by casting or extruding. The horizontally-oriented section of the supporting structures are in turn supported by a foundation. Cups 8 are formed by cutting tubes in half along a central axis with a point crossing the centre. Alternatively, the equivalent shape may be fashioned by casting or extruding. The cups 8 are installed upon the centre pointing, inside, vertically-oriented faces of the supporting structures 7, and may be attached by welding or some other joining method, or may be cast with the supporting structures 7 so that the supporting structures 7 and the cups 8 form an integral part. Bolts 9 are inserted through threads cut in the vertically-oriented section of the supporting structures 7 above and laterally displaced to each side of the longitudinal axis of the cup, such that the load cell 1 is constrained from more than a slight upward displacement by contact of the bolts 9 and the end sections 3.

Figure 3:
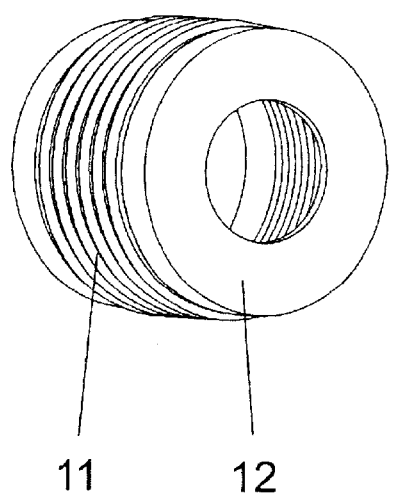
FIG. 3 is a perspective view of bellows and a washer of FIG. 1 assembled as a group.

Flexible metal bellows 11 (such as the hydraulically formed annular type manufactured by Phico Co. of Korea, "Flexible Metal Hose—Hydraulically Formed Annular Type", http://www.phico.co.kr/htube.htm) extend along the longitudinal axis of the load cell from the beginning of said transition areas closest to the centre of the load cell 1 and outward at each end to a point radially displaced from a point at the beginning of the end sections 3 closest to the force-reacting sections 2. Such bellows 11 are attached to the load cell 1 by welding. The ends of the bellows 11 closest to said beginning of the end sections 3 are preferably welded to flat washers 12, as shown in FIG. 3. The flat washers 12 are welded to said beginning of end sections 3.

Figure 2:
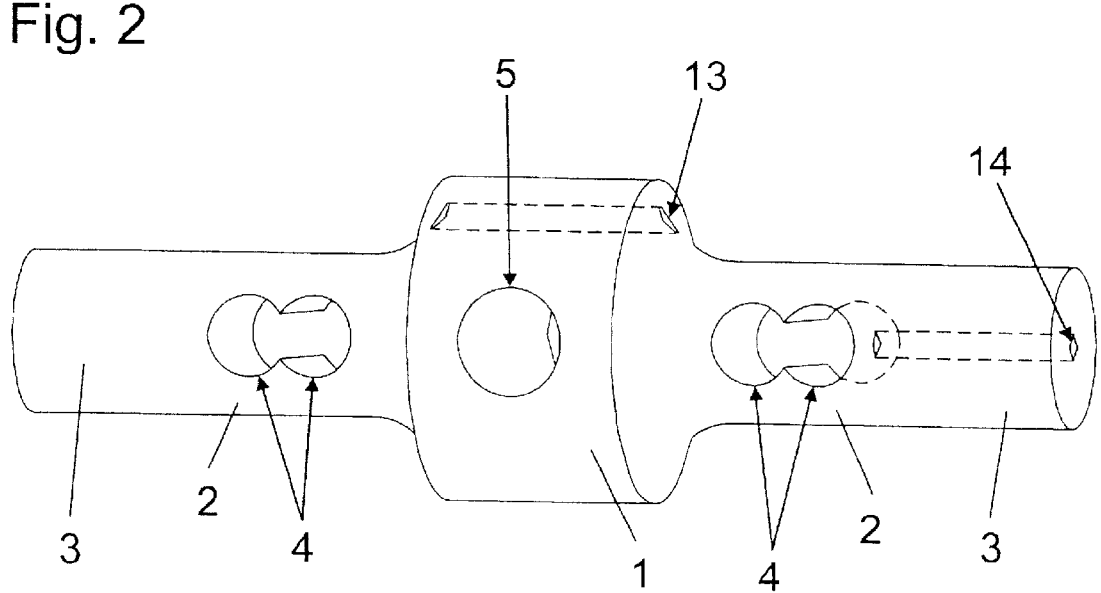
FIG. 2 is a perspective view of the load cell of FIG. 1.

In FIG. 2, there is a perspective view of the load cell 1 of FIG. 1. Material diminishments are made longitudinally along an axis radially displaced from the longitudinal axis of the load cell 1, and beginning at a point where said radially-displaced axis intersects one of the transition areas between the greatest-diameter section of the load cell 1 and the reduced diameter of one of the force-reacting sections 2 and extending through said greatest-diameter section until reaching the other said transition area, to create a bore 13, through which wires may be passed to connect the strain gages 10 from one end of the load cell 1 to the other end. Material diminishments are made longitudinally through one of the end sections 3 along the longitudinal axis of the load cell 1 and through said end section 3 until reaching the material diminishments 4 to create a bore 14 which allows wires to be connected from the load cell circuits to external locations.

Figure 5:
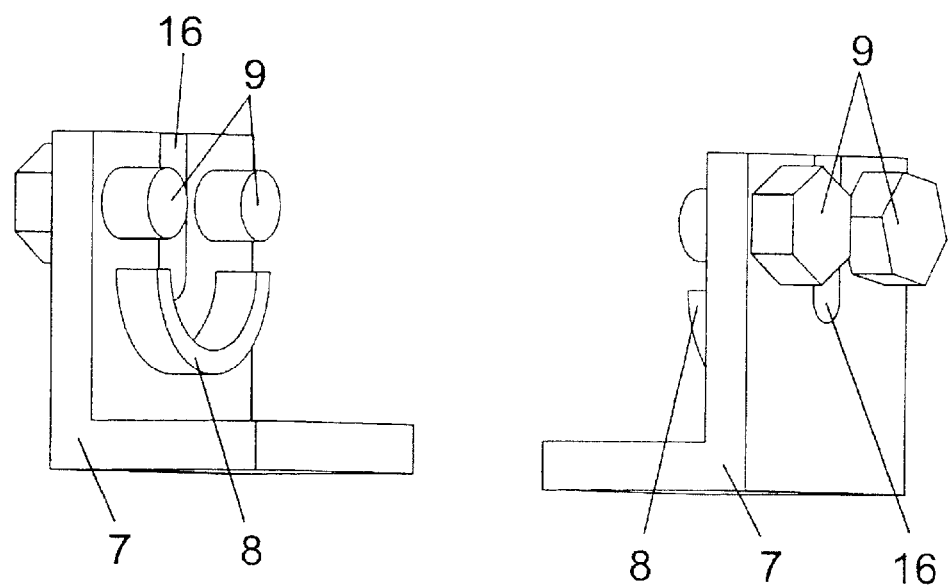
FIG. 5 is a perspective view of the mounts of FIG. 1.

In FIG. 5, there is a perspective view of the mounts of FIG. 1. Material diminishments are made through the vertically-oriented sections of the supporting structures 7 beginning at the top centre edge and proceeding to a point below the diametric centre of the cup 8, to form a slot 16 through which wires passing through bore 14 may further pass.

Figure 6:
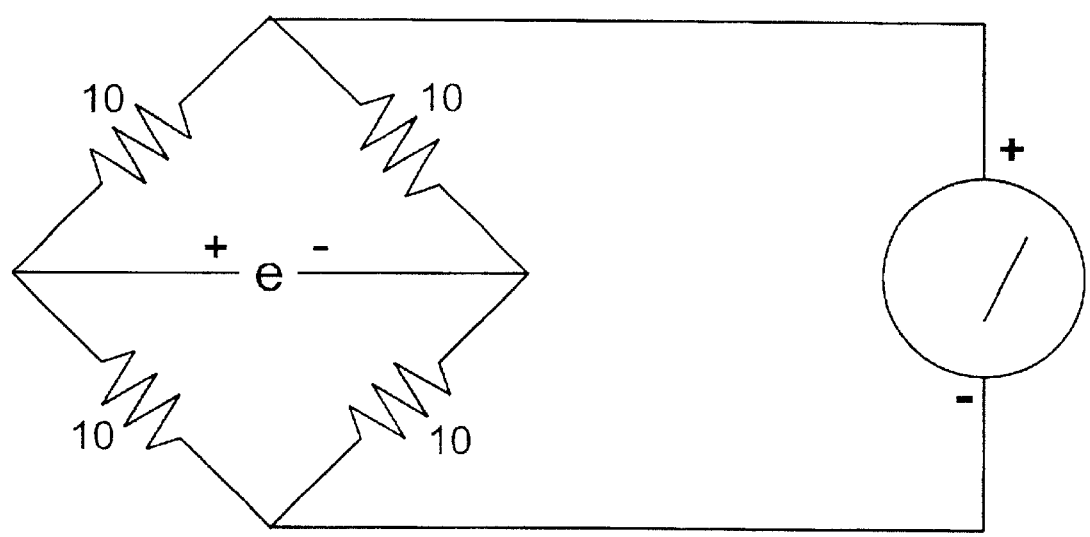
FIG. 6 is an electrical diagram of a Wheatstone bridge measuring circuit of FIG. 1.

In FIG. 6, there is an electrical diagram of a Wheatstone bridge measuring circuit of FIG. 1. Strain gages 10 are connected together in the normal manner to form a Wheatstone bridge, which is powered by voltage e and which output signal is measured by an external meter, analog-to-digital converter, or other like device.

Figure 7:
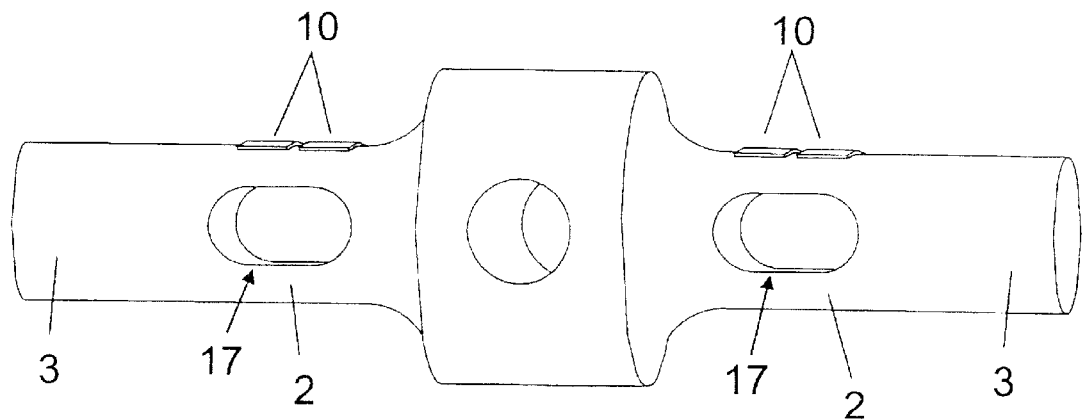
FIG. 7 is a perspective view of the load cell of FIG. 1 having alternate-shaped material diminishments of force-reacting sections.

In FIG. 7, a perspective view of the load cell of FIG. 1 having alternate-shaped material diminishments of force-reacting sections. Material diminishments 17 are made through the strain-reacting sections 2. These diminishments are different in shape that the material diminishments 4 of FIG. 1 but are equivalent in function.

Figure 8:
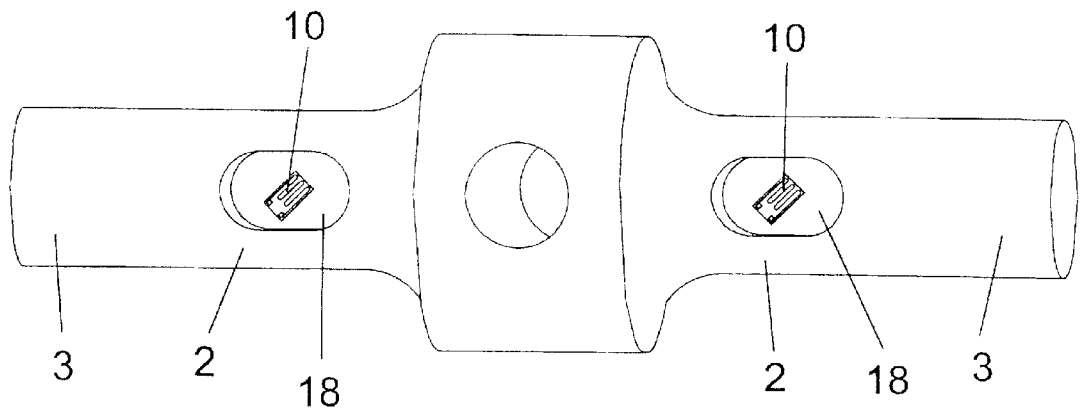
FIG. 8 is a perspective view of a load cell of FIG. 1 having alternate material diminishments of the force-reacting sections, which create shear-web surfaces in an I-beam cross section.

In FIG. 8, there is a perspective view of a load cell of FIG. 1 having alternate material diminishments of the force-reacting sections, which create shear-web surfaces in an I-beam cross section. Material diminishments 18 are made passing only part way through and symmetrically from each side of each force-reacting section 2 to form web surfaces 18, such that the horizontal cross-sections of the strain-reacting sections are in the form of an I-beam in the way used conventionally in shear-beam load cells. A plurality of strain gages 10 are mounted upon one or more, and usually upon each of the 4 web surfaces 18. The strain gages 10 are mounted at 45 degrees to the longitudinal axis of the load cell so as to respond to shear strain in the conventional way for shear-beam load cells.

Figure 9:
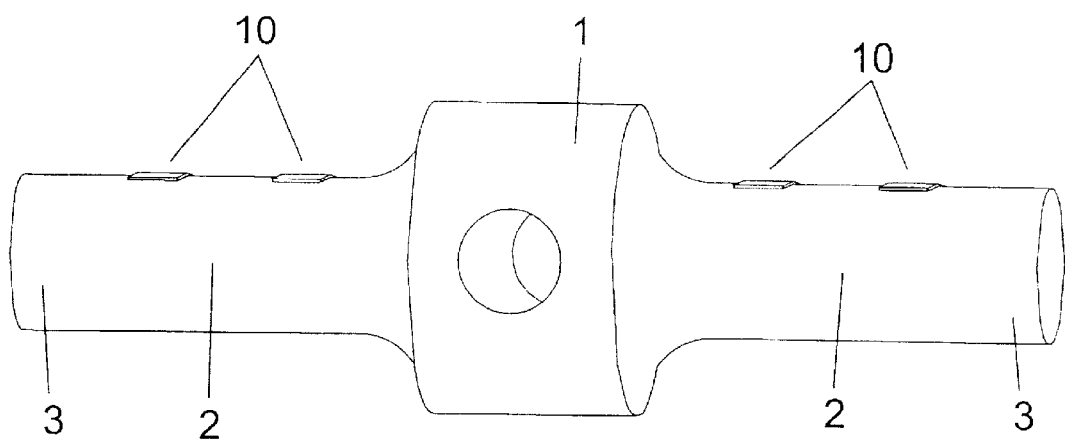
FIG. 9 is a perspective view of a load cell of FIG. 1 without material diminishments in the force-reacting sections and which functions as a differential-moment beam.

In FIG. 9, there is a perspective view of a load cell of FIG. 1 without material diminishments in the force-reacting sections and which functions as a differential-moment beam. A plurality of strain gages 10 are installed upon the force-reacting sections 2 so as to be responsive to strains resulting from differing moments along the longitudinal axis of the load cell 1, in the way common with differential-moment-beam load cells.

Figure 10:
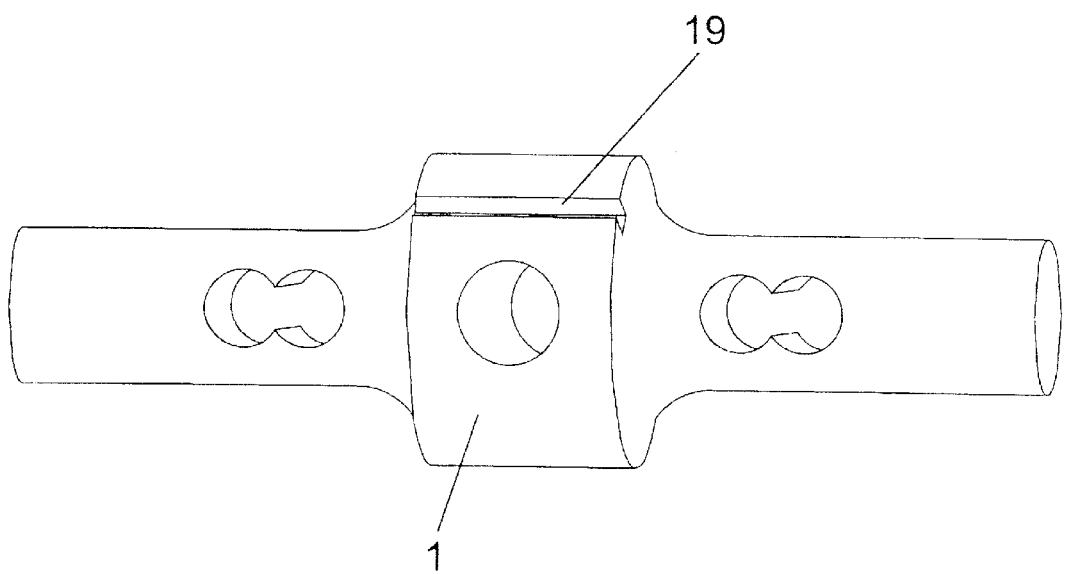
FIG. 10 is a perspective view of a load cell of FIG. 1 having an alternate means of passing wires from one end of the load cell to the other.

In FIG. 10, there is a perspective view of a load cell of FIG. 1 having an alternate means of passing wires from one end of the load cell to the other. Material diminishments are made within the greatest-diameter section of the load cell, beginning at one end of said greatest-diameter section, and continuing at a pre-defined depth to the other end of said greatest-diameter section, to form a slot 19 through which connecting wires may pass from one end of the load cell to the other.

Figure 11:
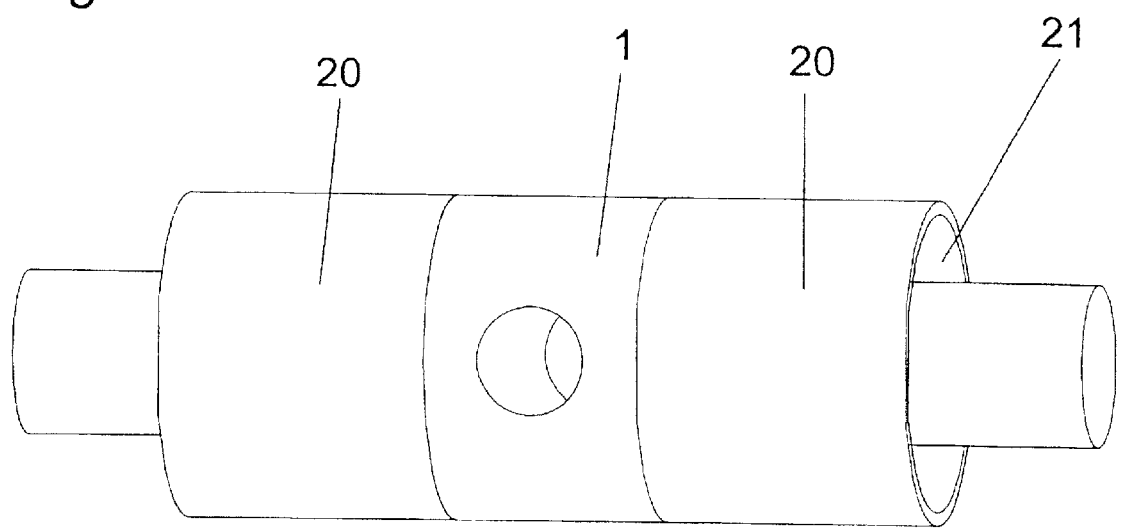
FIG. 11 is a perspective view of a load cell of FIG. 1, but with sleeves replacing the metal bellows.
Figure 12:
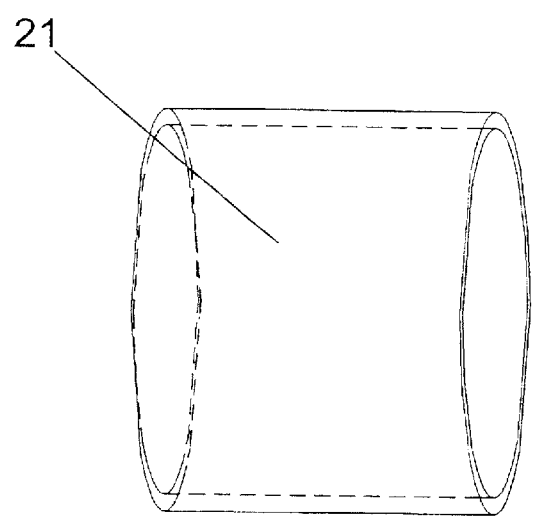
FIG. 12 is a perspective view of a sleeve of FIG. 11.

In FIG. 11, is a perspective view of a load cell of FIG. 1, but with sleeves 20 replacing the metal bellows. The sleeves 20 are installed concentric to the load cell with the outside diameter of each sleeve 20 preferably being equal to or smaller than the diameter of the greatest-diameter section of the load cell 1, to form cavities into which a solidifying liquid potting material 21 such as 2-part polyurethane may be inserted to form sealed areas around the strain gages and other internal circuitry. A sleeve 20 is shown in FIG. 12.

Figure 13:
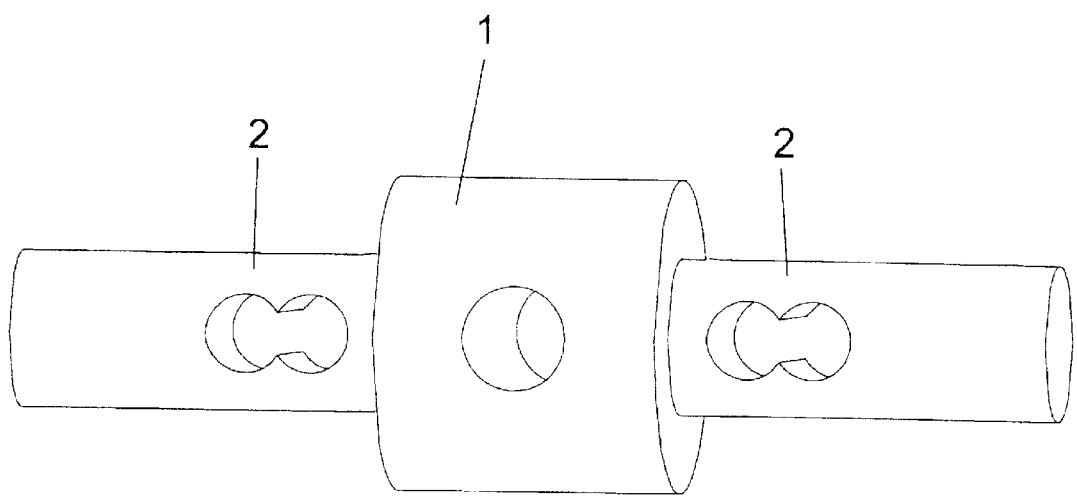
FIG. 13 is a perspective view of a load cell of FIG. 1 with stepped transition areas between the greatest-diameter section and the smaller-diameter sections.

In FIG. 13, there is a perspective view of a load cell of FIG. 1 with stepped transition areas between the greatest-diameter section and the smaller-diameter sections. The initial major material diminishments of FIG. 1 are made such that the transition areas between the greatest-diameter section of the load cell 1 and the force-reacting sections 2 are in the form of steps.

Figure 14:
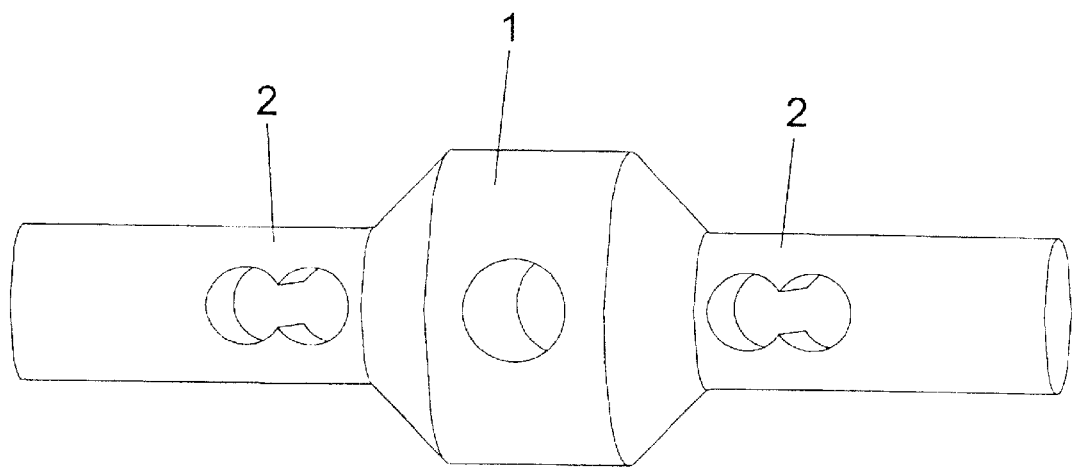
FIG. 14 is a perspective view of a load cell of FIG. 1 with tapered transition areas between the greatest-diameter section and smaller-diameter sections.

In FIG. 14, there is a perspective view of a load cell of FIG. 1 with tapered transition areas between the greatest-diameter section and smaller-diameter sections. The initial major material diminishments of FIG. 1 are made such that the transition areas between the greatest-diameter section of the load cell 1 and the force-reacting sections 2 are in the form of tapers.

Figure 15:
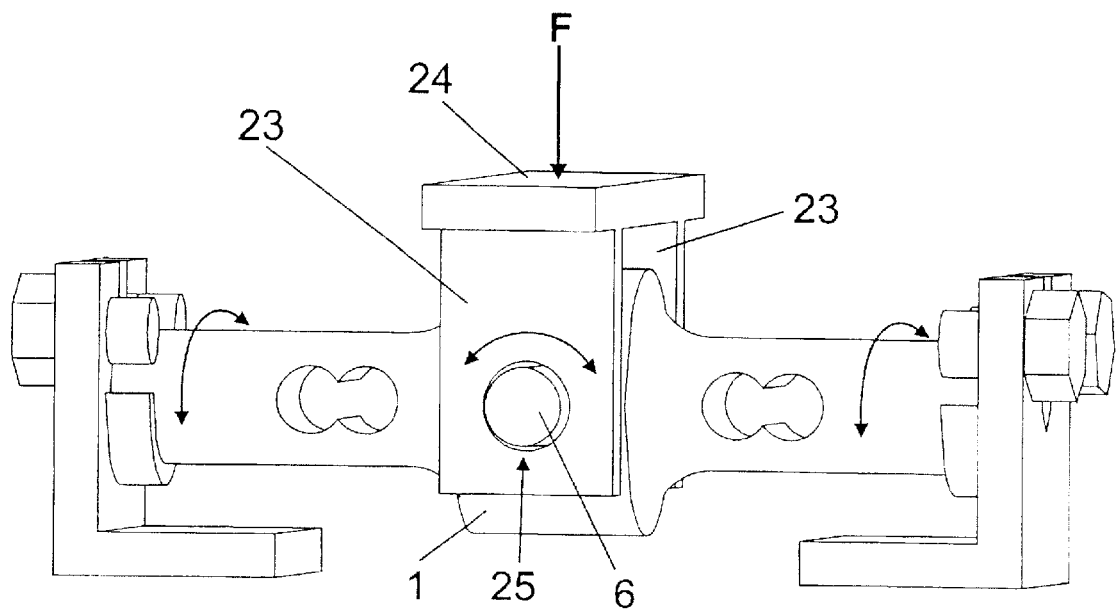
FIG. 15 is a perspective view of a load cell and mounts of FIG. 1 with an additional top-centre force-receiving structure.

In FIG. 15, there is a perspective view of a load cell and mounts of FIG. 1 with an additional top-centre force-receiving structure. A U-shaped force-receiving structure is comprised of vertically-oriented members 23 of which upper edges are fastened, preferably by welding, at right angles to the lower side of the horizontal member 24. Material diminishments are made through the upright members to form holes 25 through which the opposite ends of the pin 6 may pass, so that the force F is transmitted through said U-shaped structure to each end of the pin 6 and then to the load cell 1. This configuration allows tipping of said force-receiving structure, which can counteract small misalignments between the load cell 1 and applied force F. The said U-shaped structure may also be formed in the equivalent shape in whole or in part by casting. It is preferable that the inside distances between the members 23 and the load cell 1 should exceed the total clearance distances, between the load cell 1 and the vertical sections of the supporting structures 7, by at least 100%, to allow for thermal expansion in the supporting foundation or any supported structure.

Figure 16:
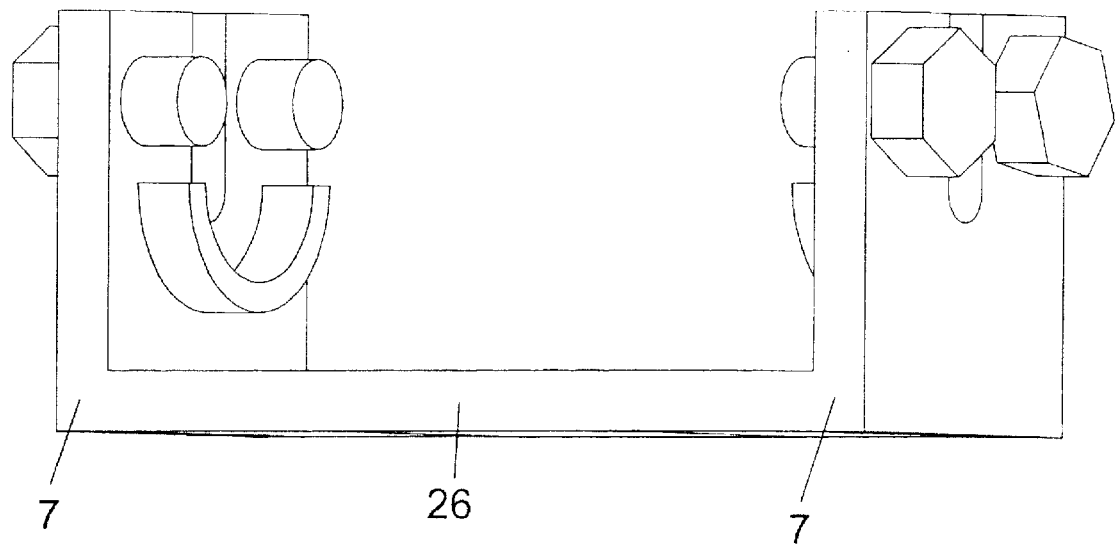
FIG. 16 is a perspective view of the mounts of FIG. 1 joined in the centre.

In FIG. 16, there is a perspective view of the mounts of FIG. 1 joined in the centre. The mounts 7 of FIG. 1 are combined into one assembly, such that the inside edges of the horizontal parts of the mounts/supporting structures 7 are each joined to an intermediate section 26, to provide a fixed distance between said end mounts to eliminate the need to set this distance during installation in the field.

Figure 17:
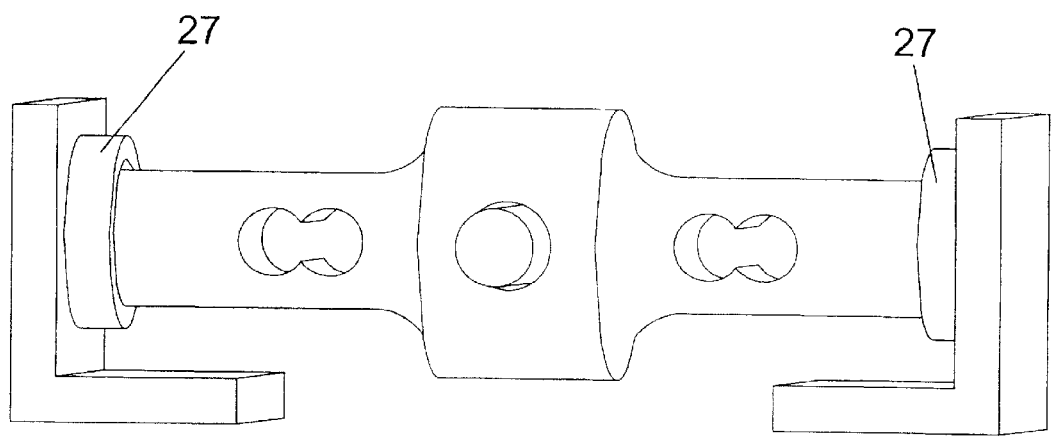
FIG. 17 is a perspective view of a load cell of FIG. 1 fixtured in mounts which utilize pipes instead of cups.

In FIG. 17, there is a perspective view of a load cell of FIG. 1 fixtured in mounts which utilize pipes 27 instead of cups 8. The mounts 7 are made such that pipes 27 replace the cups 8 of FIG. 1.

Figure 18:
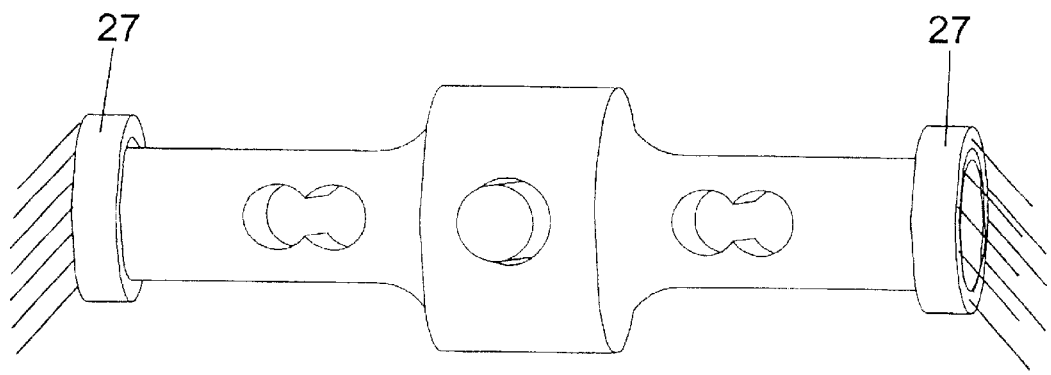
FIG. 18 is a perspective view of a load cell of FIG. 1 fixtured with pipes as the sole mounting structures.

In FIG. 18, there is a perspective view of a load cell of FIG. 1 fixtured with pipes as the sole mounting structures. The mounts consist only of the pipes 27, the outward ends of said pipes being directly fastened, for example, by welding, or threading, etc., to a vertically-oriented base foundation, and therefore omitting supporting structures 7.

Figure 19:
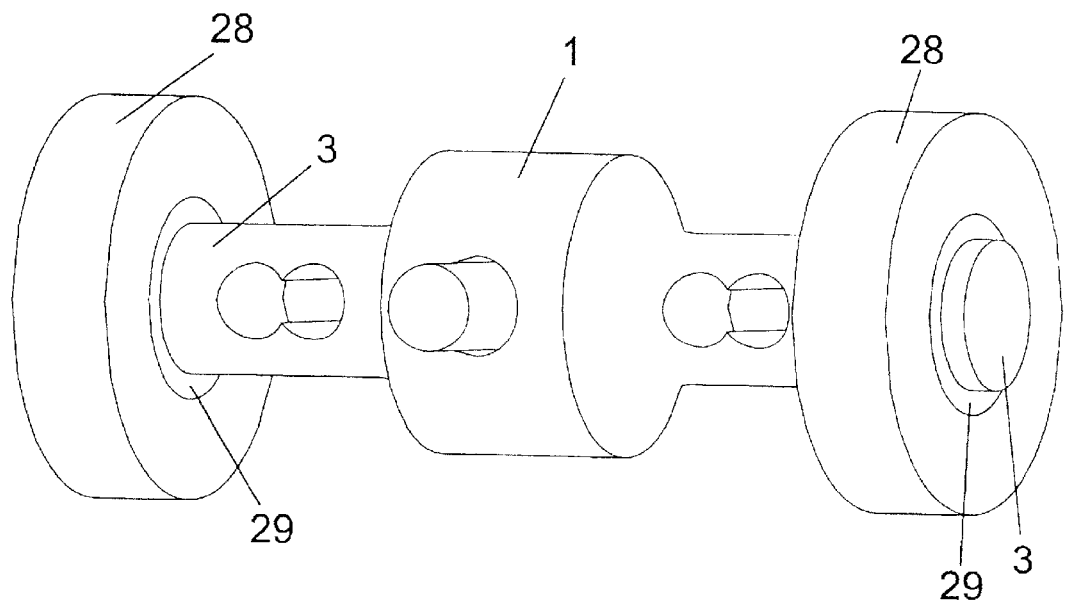
FIG. 19 is a perspective view of a load cell of FIG. 1 with a wheel or pulley attached to each end section.

In FIG. 19, there is a perspective view of a load cell of FIG. 1 with a wheel or pulley attached to each end section. Wheels or pulleys 28 may support the end sections 3 by means of bearings 29 which are mounted between the wheels or pulleys 28 and the load cell 1, said bearings 29 being aligned concentric to both the longitudinal axis of the load cell and the rotational axes of the wheels or pulleys 28.

Figure 20:
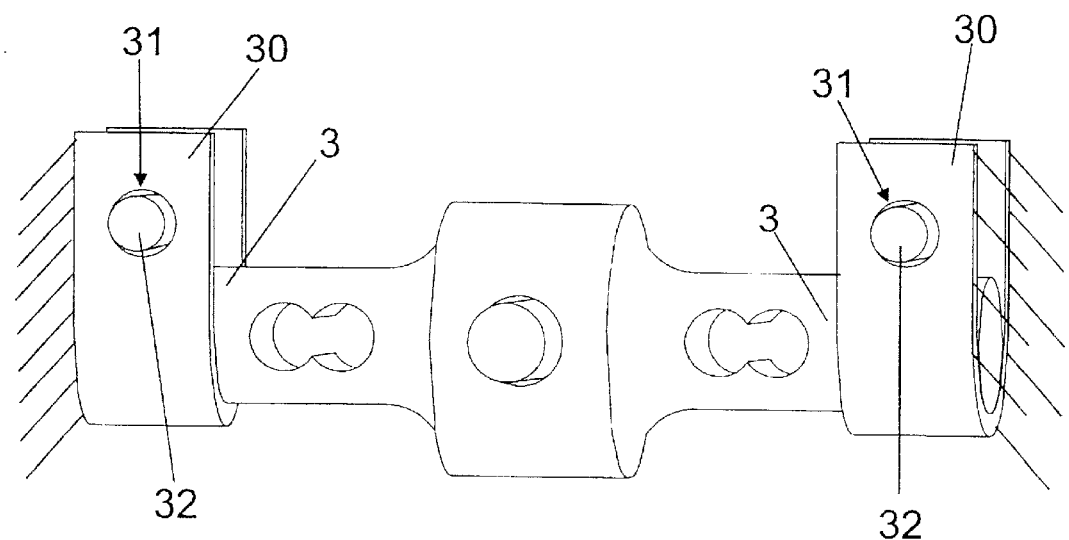
FIG. 20 is a perspective view of a load cell of FIG. 1 with U-shaped mounts.

In FIG. 20, there is a perspective view of a load cell of FIG. 1 with U-shaped mounts. The U-shaped and top open ended beam-supporting structures 30 are mechanically connected to a base foundation to support end sections 3. Material diminishments are made through the vertically-oriented walls of said beam-supporting structures 30 to form bores 31 which in turn allow insertion of pins 32 which hold the load cell captive.

Figure 21:
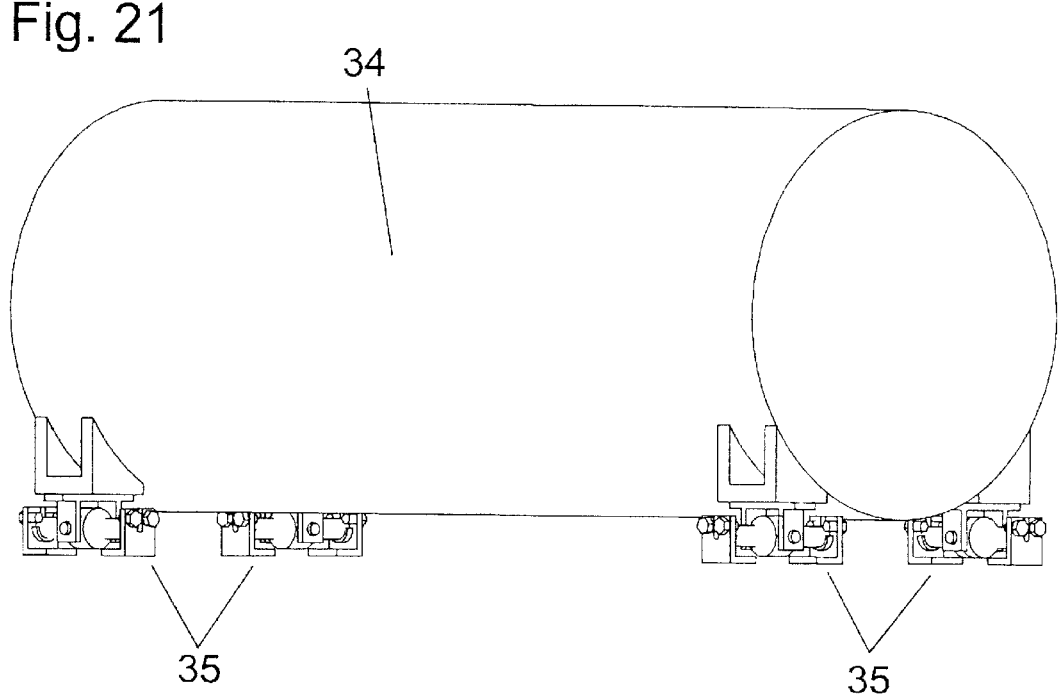
FIG. 21 is a perspective view of an horizontally-oriented container mounted upon load cell and mount assemblies of FIG. 15.

In FIG. 21, there is a perspective view of an horizontally-oriented container mounted upon load cell and mount assemblies of FIG. 15. A container or other structure is supported by the load cell and mount assemblies 35, which were illustrated in FIG. 15. The assemblies 35 are preferably mounted toward the perimeter of the structure and in a mutually angularly displaced orientation, such angle being determined by dividing 360-degrees by the number of assemblies 35 supporting the structure. For four assemblies 35, for example, the angle would be 90-degrees.

Figure 22:
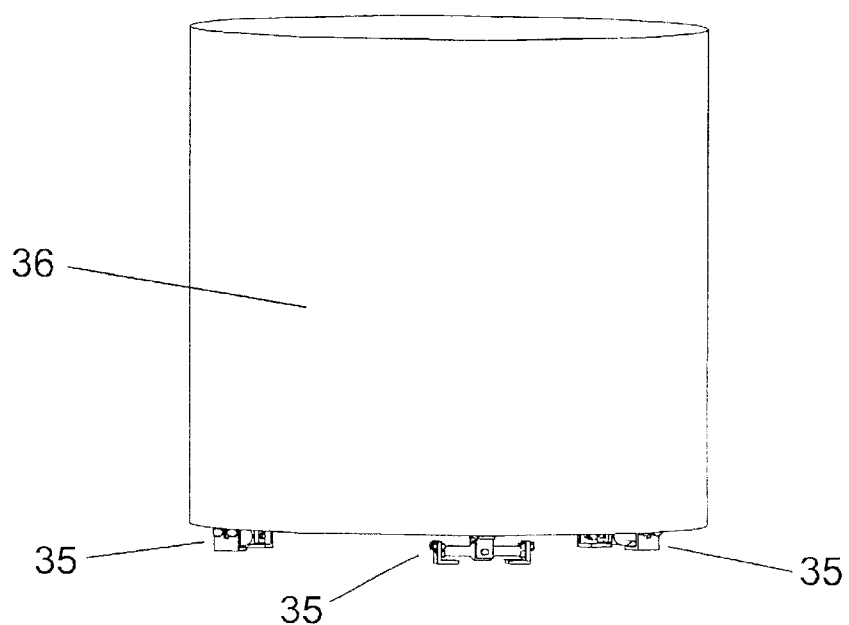
FIG. 22 is a perspective view of a vertically-oriented container mounted upon load cell and mount assemblies of FIG. 15.

In FIG. 22, there is a perspective view of a vertically-oriented container mounted upon load cell and mount assemblies of FIG. 15. Only three load cell and mount assemblies 35 are needed to support a round structure.

Figure 23:
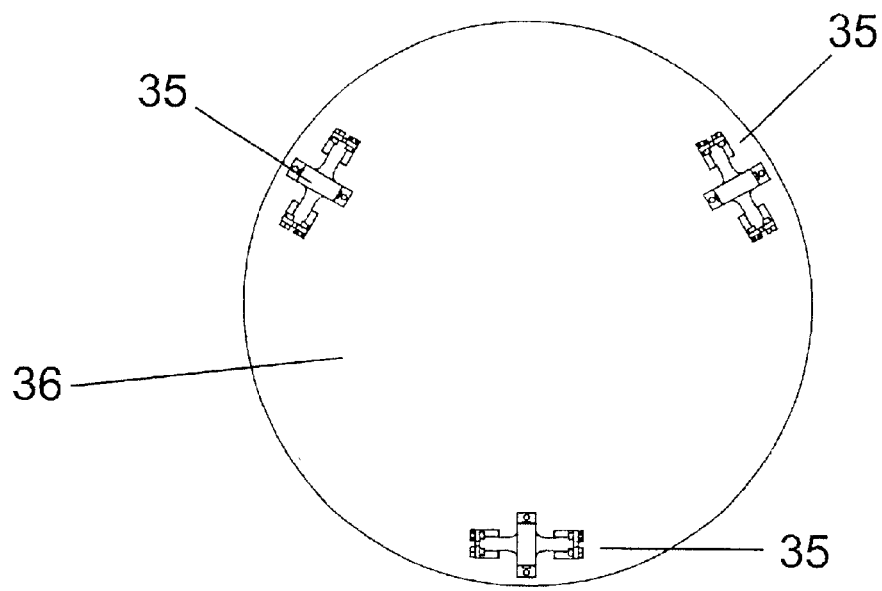
FIG. 23 is a top plan view of the container mounted on load cell and mount assemblies of FIG. 22, which are aligned tangentially to the edge of the container.

In FIG. 23, there is a top plan view of the container mounted on load cell and mount assemblies of FIG. 22, which are aligned tangentially to the edge of the container. Three load cell and mount assemblies 35 support a structure 36 and are preferably mounted near the outer edge of said structure 36. The assemblies 35 are aligned at 120-degree angles to each other and tangential to the outer edge of the said structure 35.

Figure 24:
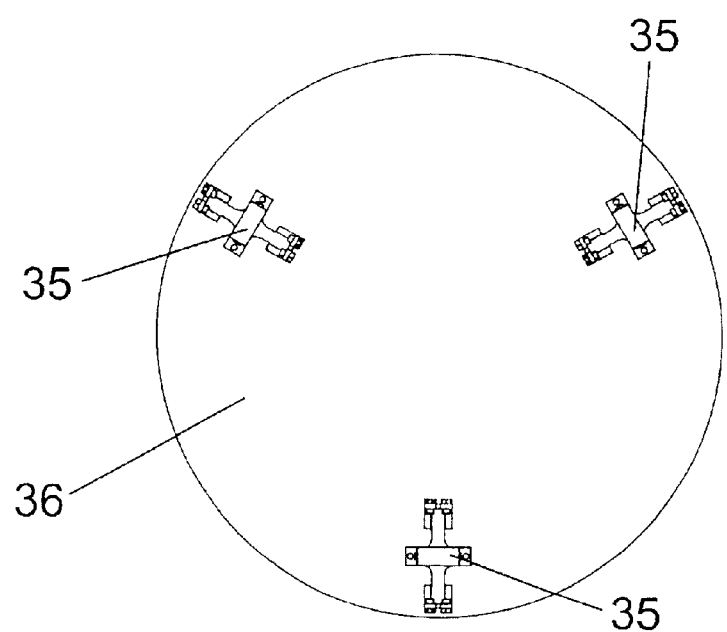
FIG. 24 is a top plan view of a vertically-oriented container alternately mounted on load cell and mount assemblies of FIG. 15 such that the long axis of the load cells and mounts are aligned radially relative to the centre of the container.

In FIG. 24, there is a top plan view of a vertically-oriented container alternately mounted on load cell and mount assemblies of FIG. 15 such that the long axis of the load cells and mounts are aligned radially relative to the centre of the container. Three load cell and mount assemblies 35 support a structure 36 and are preferably mounted near the outer edge of said structure 36. The assemblies are aligned at 120-degree angles to each other and such that the longitudinal axes of the assemblies 36 are aligned radially from the centre of said structure 35.

Figure 25:
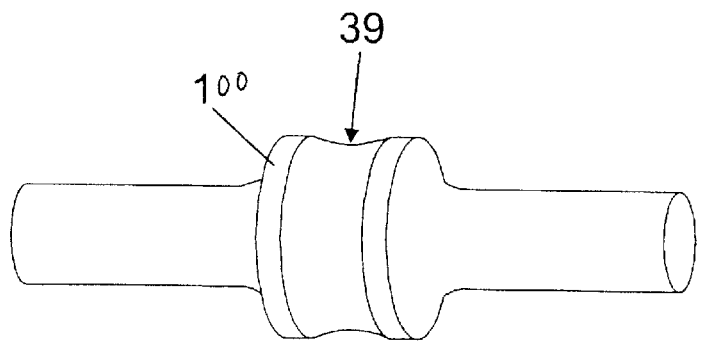
FIG. 25 is a perspective view of a load cell of FIG. 1 modified with material diminishments made in the greatest-diameter section to form a concave groove to accommodate a loading link.

In FIG. 25, there is a perspective view of a load cell 100 of FIG. 1 without bore 5 and modified with material diminishments made in the greatest-diameter section to form a concave groove to accommodate a loading link. Material diminishments are made, preferably by lathe-turning, into the centre greatest-diameter section of the load cell 100 to form a concave groove 39, upon which a link or similar device may rest to apply force to the load cell 100.

Figure 26:
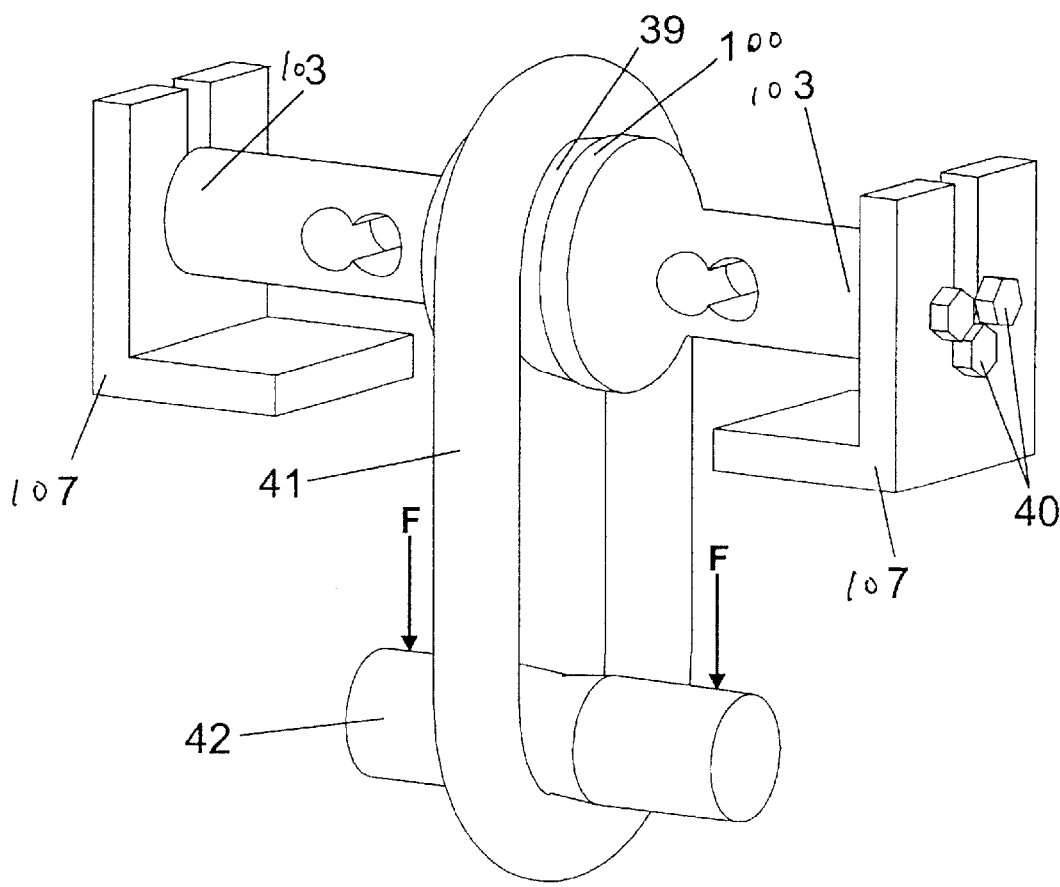
FIG. 26 is a perspective view of a centre-loading, load cell and link assembly with the load cell of FIG. 25.

In FIG. 26, there is a perspective view of a centre-loading, load cell and link assembly with the load cell 100 of FIG. 25. The load cell 100 according to modifications illustrated in FIG. 25 is secured, through its end sections 103, to the supporting structures 107 by means of a plurality of bolts 40 fastened into threads drilled into the end sections 103 to prevent rotation of the load cell 38 relative to the supporting structures 107. A link 41, such as those made by Crosby Group, rests upon the groove 39 and further supports a pin 42, to each end of which is applied the force to be measured F.

Figure 27:
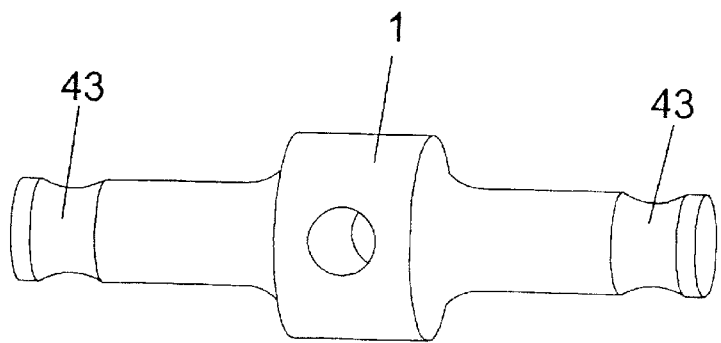
FIG. 27 is a perspective view of a load cell of FIG. 1 modified with material diminishments made in the end sections to form concave grooves to accommodate end-supporting links.

In FIG. 27, there is a perspective view of a load cell of FIG. 1 modified with material diminishments made in the end sections to form concave grooves 43 to accommodate end-supporting links 44. Material diminishments are made, preferably by lathe-turning, into end sections 3 of the load cell 1 to form concave grooves 43, which may rest upon a link 44 or similar device to support the load cell 1.

Figure 28:
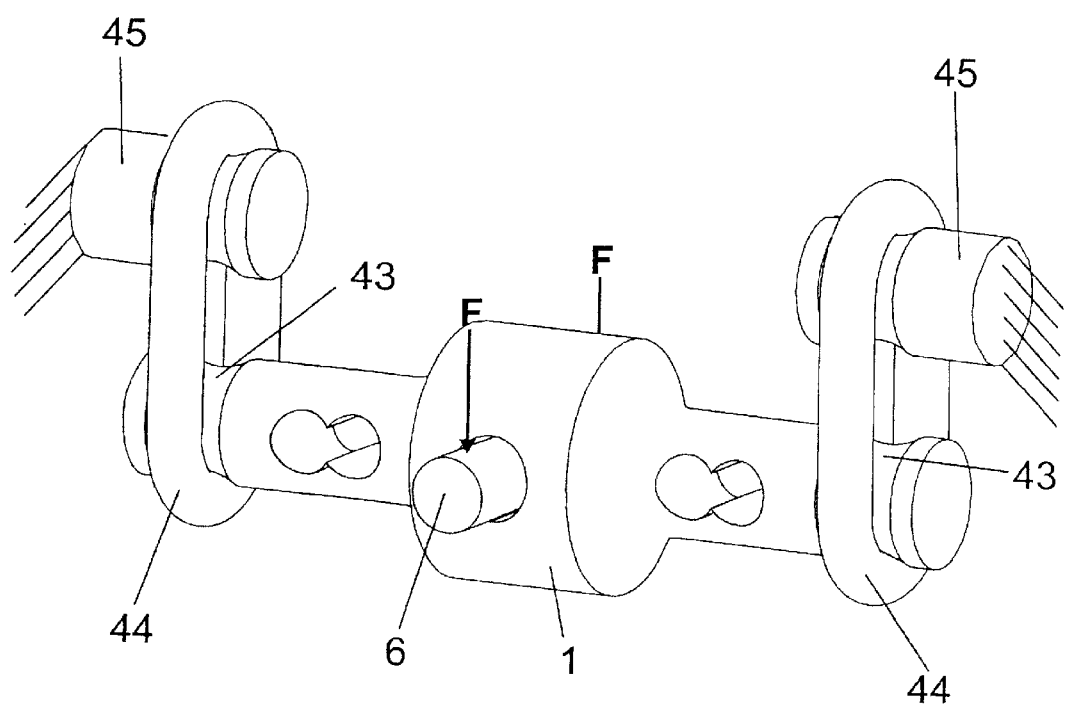
FIG. 28 is a perspective view of an end-supporting, load cell and link assembly with the load cell of FIG. 27.

In FIG. 28, there is a perspective view of an end-supporting, load cell and link assembly with the load cell of FIG. 27. The load cell 1 according to modifications as illustrated in FIG. 27 rests with its grooves 43 upon links 44. The links 44 are supported by pins 45 which are rigidly connected to a base foundation. Forces are in turn applied to the load cell 1 by means of pin 6.

Figure 29:
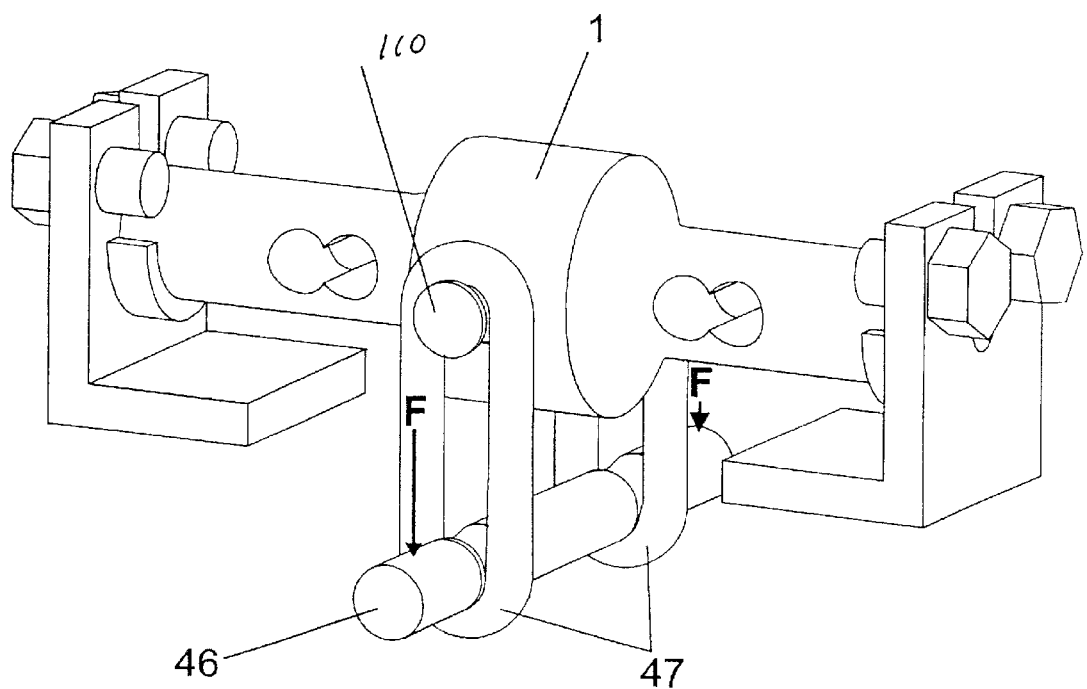
FIG. 29 is a perspective view of a double-centre-loading, load cell and link assembly with the load cell of FIG. 1 having a pin incorporating concave grooves.

In FIG. 29, there is a perspective view of a double-centre-loading, load cell and link assembly with the load cell of FIG. 1 having a pin 110 with concave grooves. Force F is applied to each end of a pin 46, which loads a pair of links 47, which in turn applies force to each end of pin 6 to introduce the force to the load cell 1.

Figure 30:
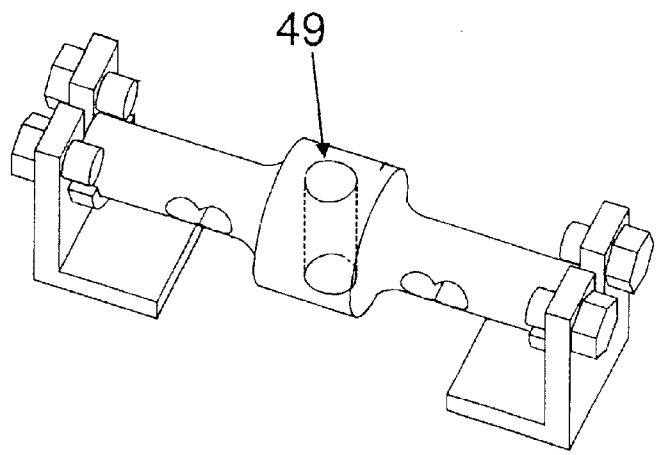
FIG. 30 is a perspective view of an alternate load cell and mounts with material diminishments made vertically through the greatest-diameter section.

In FIG. 30, there is a perspective view of an alternate load cell and mounts with material diminishments made vertically through the greatest-diameter section. The material diminishments are made through the centre greatest-diameter section of the load cell to create a vertically-oriented bore 49, through which the rod string of a pump-jack, hydraulic, or other type of reciprocating oil well may pass.

Figure 31:
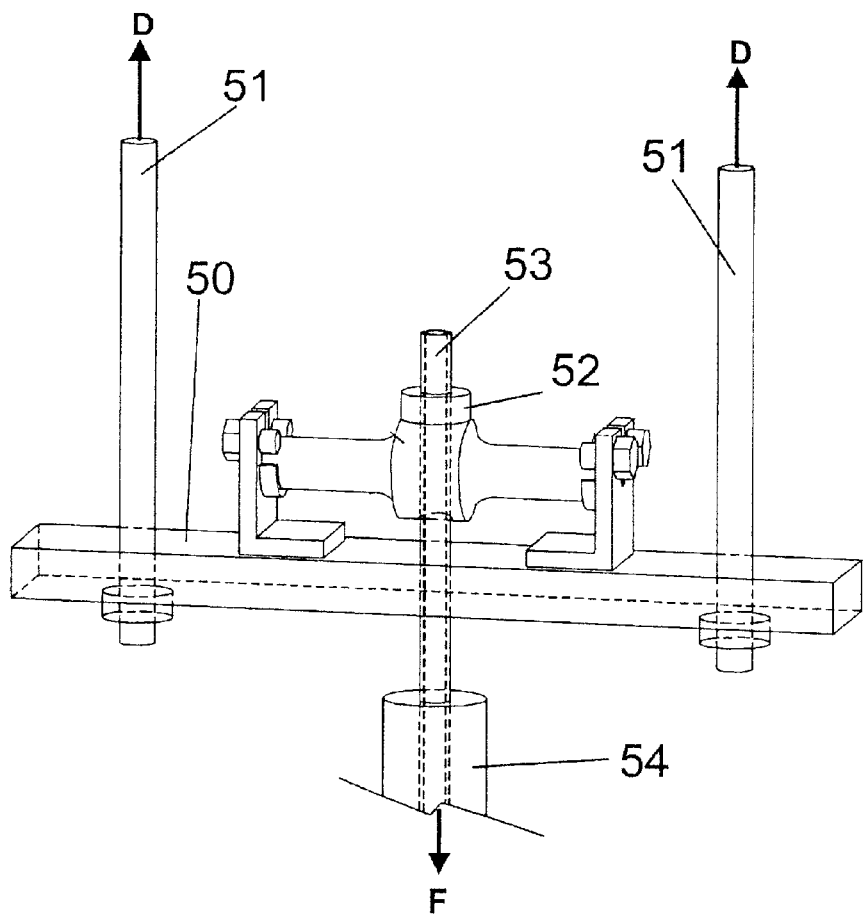
FIG. 31 is a perspective view of the load cell and mounts of FIG. 30 mounted within a reciprocating oil well head.

In FIG. 31, there is a perspective view of the load cell and mounts of FIG. 30 mounted within a reciprocating oil well head. The load cell of FIG. 30 is mounted upon the crossbar 50 of a conventional oil well. Vertical displacements D, driven by a reciprocating up-down power transmission system, and applied to the oil well's wire-rope or other type of bridle 51, cause the crossbar and the load cell and mount assembly to displace accordingly. A clamping device, locked by clamping pressure to the rod string 53, rests upon the load cell of FIG. 30, and as displacement is exerted upon the load cell, resistance is offered by means of reaction force F exerted through the clamp and onto the load cell. The force F is derived as a combination of the pumping force and the force of gravity acting upon the rod string mass extending both above ground and underground below the well head. This configuration is useful in pump-off control and dynamometer (dyno-card) applications.

Figure 32:
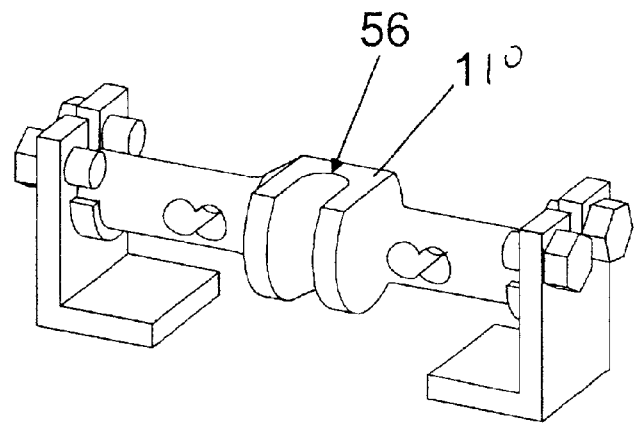
FIG. 32 is a perspective view of an alternate load cell and mounts with material diminishments made vertically through and open to one side of the greatest-diameter section.

In FIG. 32, there is a perspective view of an alternate load cell and mounts with material diminishments made vertically through and open to one side of the greatest-diameter section instead material diminishments are made through the centre greatest-diameter section of load cell 110 to create a vertically-oriented, front-side-opening slot 56, through which the rod string of a pump-jack, hydraulic, or other type of reciprocating oil well may pass.

Figure 33:
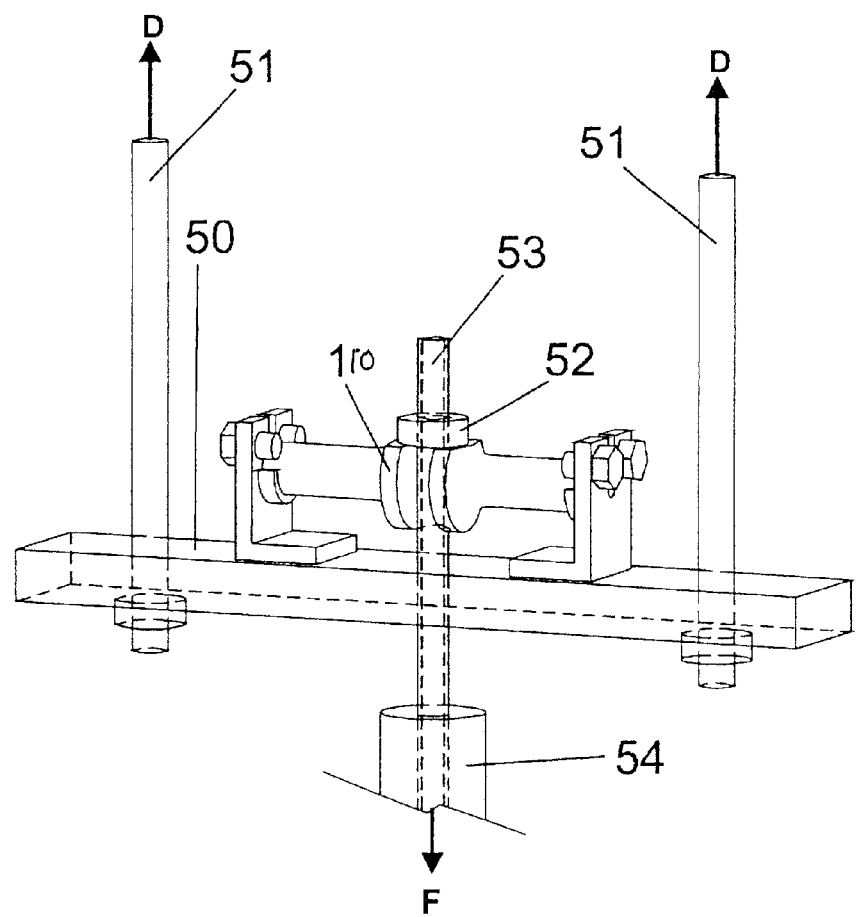
FIG. 33 is a perspective view of the load cell and mounts of FIG. 32 mounted within a reciprocating oil well head.

In FIG. 33, there is a perspective view of the load cell and mounts of FIG. 32 mounted within a reciprocating oil well head. The load cell 110 according to modifications illustrated in FIG. 32 is mounted upon the crossbar 50 of a conventional oil well. Vertical displacements D, driven by a reciprocating up-down power transmission system, and applied to the oil well's wire-rope or other type of bridle 51, cause the crossbar and the load cell and mount assembly to displace accordingly. A clamping device, locked by clamping pressure to the rod string 53, rests upon the load cell 110, and as displacement is exerted upon the load cell, resistance is offered by means of reaction force F exerted through the clamp and onto the load cell. The force F is derived as a combination of the pumping force and the force of gravity acting upon the rod string mass extending both above ground and underground below the well head. This configuration is useful in pump-off control and dynamometer (dyno-card) applications.

Figure 34:
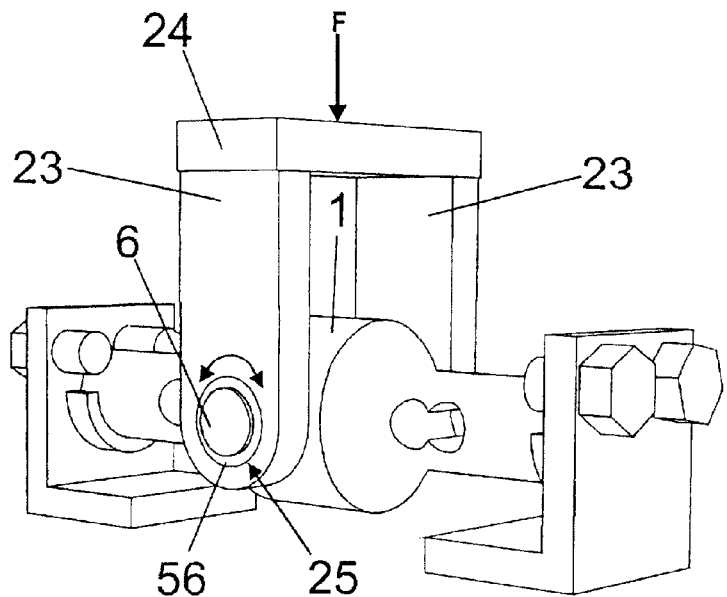
FIG. 34 is a perspective view of a load cell and mounts of FIG. 1 in combination with centre-loading bearings to improve tipping characteristics.

In FIG. 34, there is a perspective view of a load cell and mounts of FIG. 1 in combination with centre-loading bearings 56 to improve tipping characteristics. The bearings 56 are inserted between the bore 25 and the pin 6, at each end of the pin, to increase wearability and improve the tipping characteristics of the force-receiving parts 23 and 24.

Figure 35:
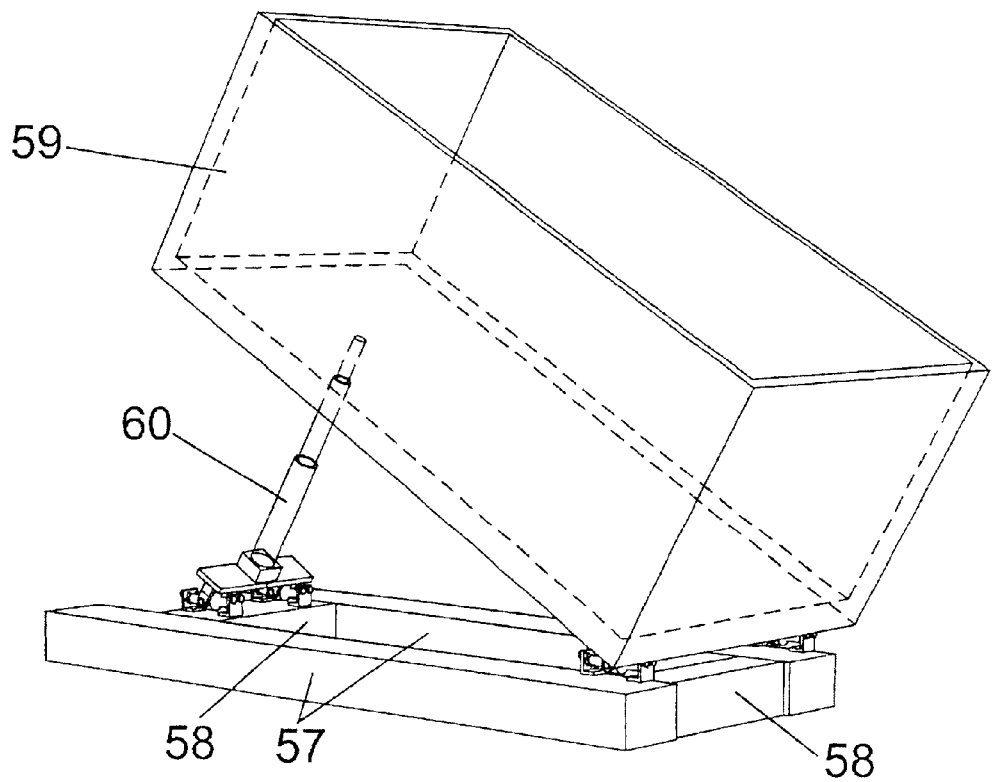
FIG. 35 is a perspective view of the assembly of FIG. 34 installed within a dump truck or tipping gear.
Figure 36:
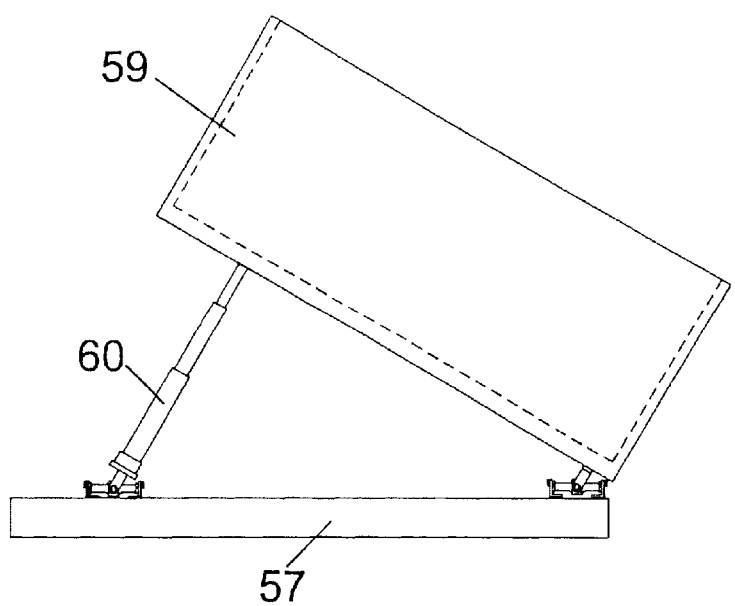
FIG. 36 is a front plan view of the assembly of FIG. 35.
Figure 37:
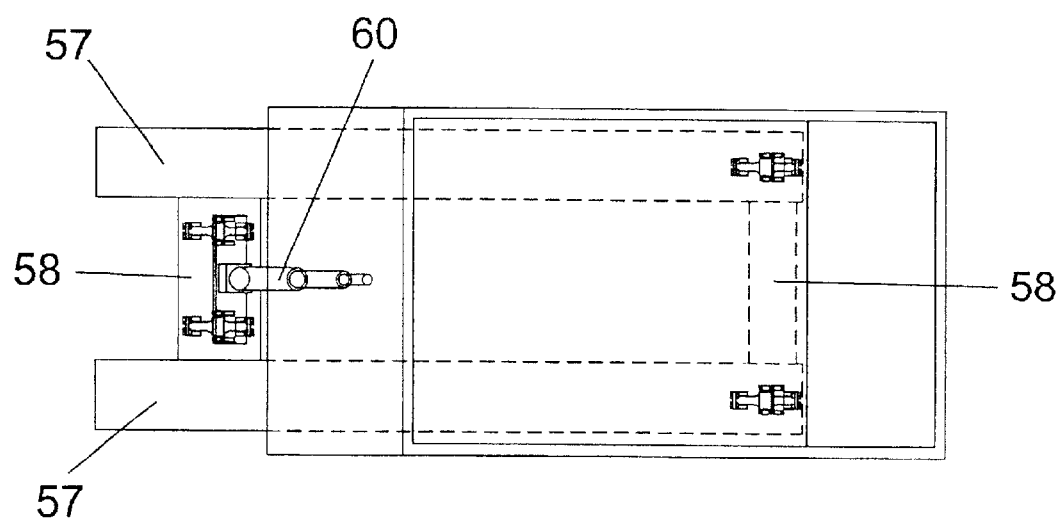
FIG. 37 is a top plan view of the assembly of FIG. 35.

In FIGS. 35, 36, and 37, there are a perspective view, a front view, and a top plan view of the assembly of FIG. 34 installed within a dump truck or tipping gear. Main beams 57 and cross-members 58 form a frame, such as that of a motor vehicle (truck). Load cell and mount assemblies according to FIG. 34 are installed longitudinally with respect to the main beams 57, between the front-most of the cross-members 58, and a hoist 60 which comprises a base and an hydraulic ram, to support the front end of a tipping box 59. Additional load cell and mount assemblies according to FIG. 34 are installed longitudinally with respect to main beams 57, between the main beams 57 and the tipping box 59, so as to form hinge-points which allow the tipping box 59 to tip. In this manner, the box 59 and the hoist 60 are both allowed to tip relative to the frame.

Figure 38:
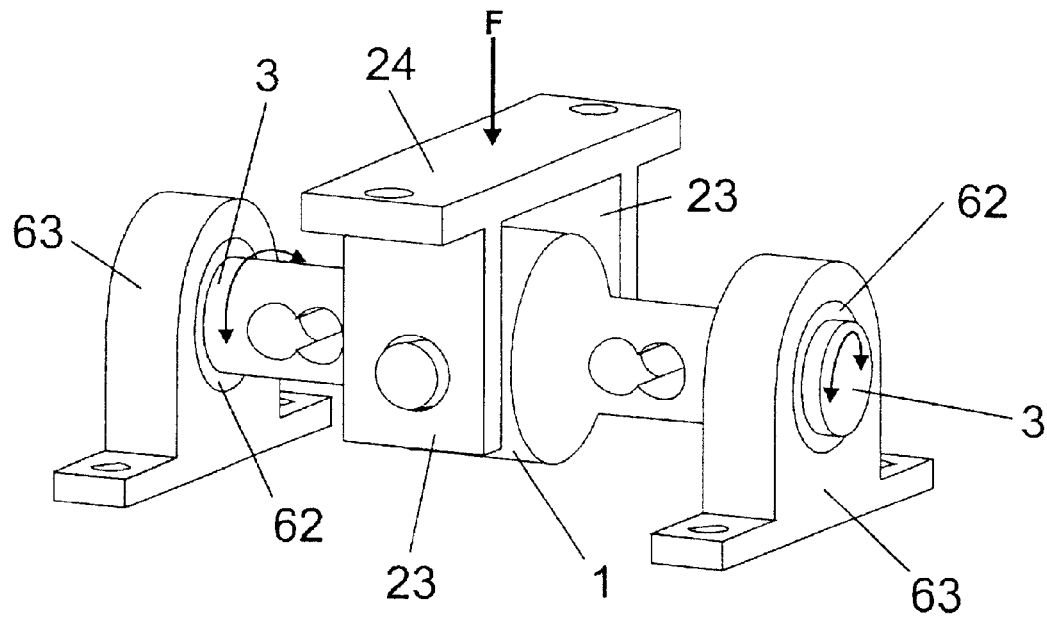
FIG. 38 is a perspective view of a load cell and mounts of FIG. 1 incorporating end-supporting bearings to improve tipping characteristics.

In FIG. 38, there is a perspective view of a load cell and mounts of FIG. 1 incorporating end-supporting bearings 63 to improve tipping characteristics. The bearing housings 63 rest upon a base foundation (not shown). Bearings 62 are mounted concentrically between bearing housings 63 and the end sections 3 of the load cell 1, to allow free tipping of the entire load cell 1 along with force-receiving parts 23 and 24 along the longitudinal axis of the load cell.

Figure 39:
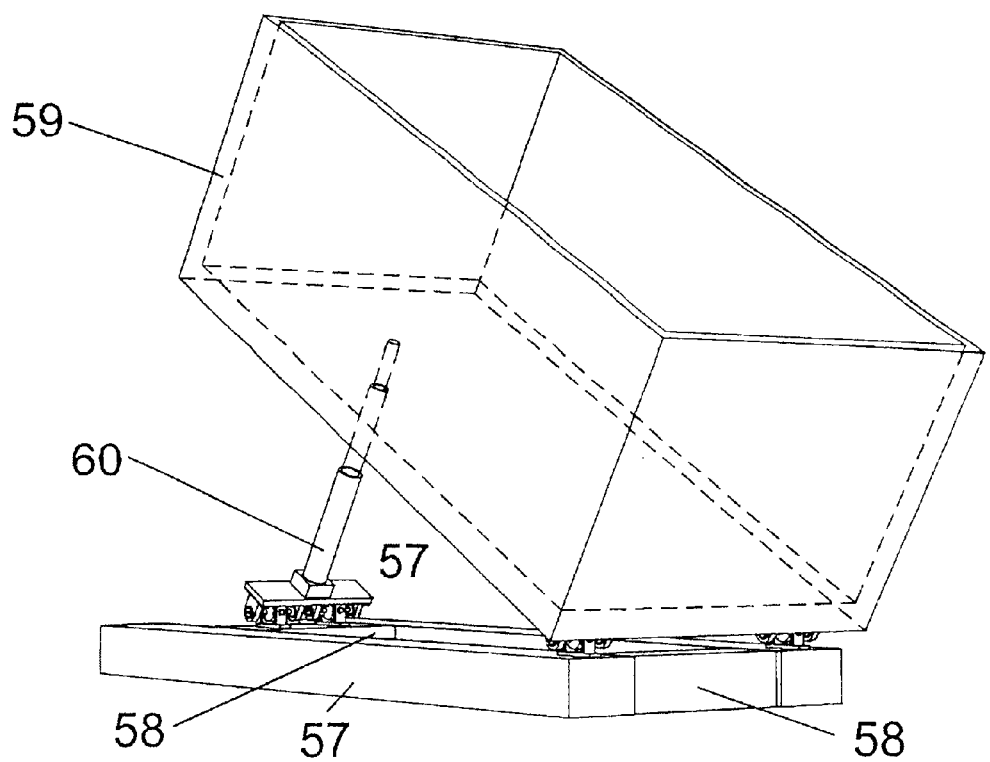
FIG. 39 is a perspective view of the assembly of FIG. 38 installed within a dump truck or tipping gear.
Figure 40:
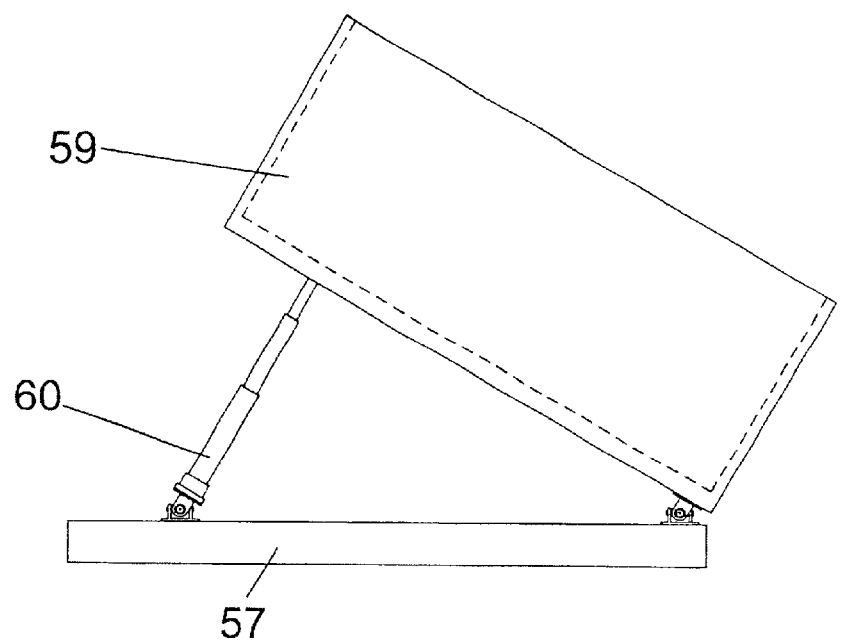
FIG. 40 is a front plan view of the assembly of FIG. 39.
Figure 41:
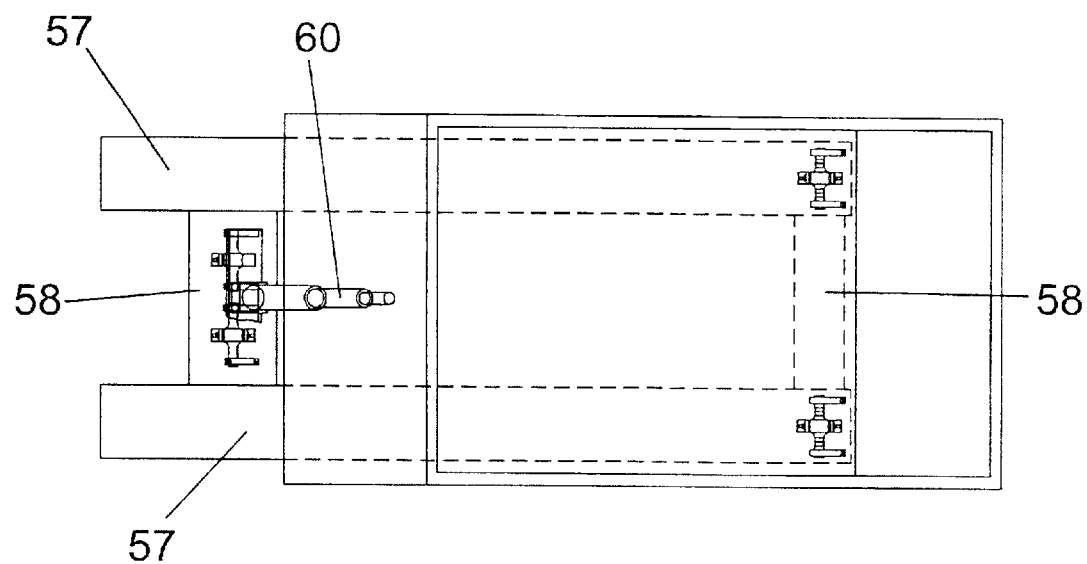
FIG. 41 is a top plan view of the assembly of FIG. 39.

In FIGS. 39, 40, and 41, there are a perspective view, a front view, and a top plan view of the assembly of FIG. 38 installed within a dump truck or tipping gear of FIGS. 35, 36, and 37. The main beams 57 and cross-members 58 form a frame, such as that of a motor vehicle (truck). Load cell and mount assemblies according to FIG. 38 are installed laterally with respect to the main beams 57, between the front-most of the cross-members 58, and a hoist 60 which comprises a base and an hydraulic ram, to support the front end of a tipping box 59. Additional load cell and mount assemblies according to FIG. 38 are installed laterally with respect to main beams 57, between the main beams 57 and the tipping box 59, so as to form hinge-points which allow the tipping box 59 to tip. In this manner, the box 59 and the hoist 60 are both allowed to tip relative to the frame.

Figure 42:
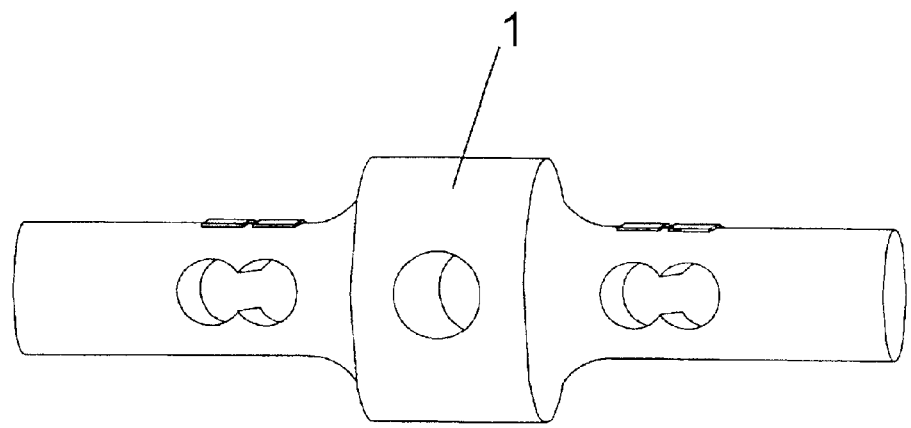
FIG. 42 is a perspective view showing the relative size of the parallelogram-beam load cell of FIG. 1 and an alternative of equivalent force capacity but not incorporating the initial major material diminishments of FIG. 1.
Figure 42:
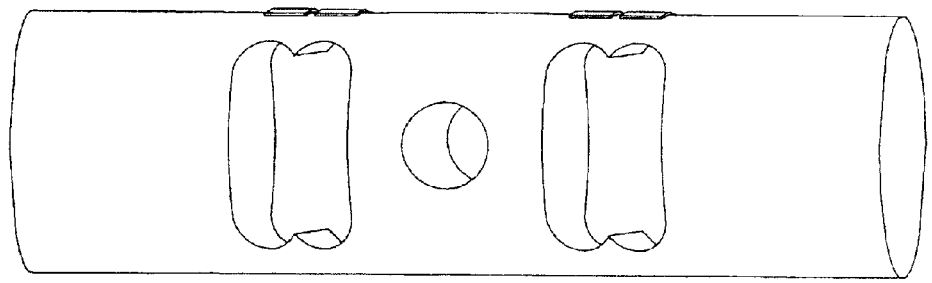

In FIG. 42, there is a perspective view showing the relative size of the parallelogram-beam load cell of FIG. 1 and an alternative of equivalent force capacity but not incorporating the initial major material diminishments of FIG. 1.

Figure 43:
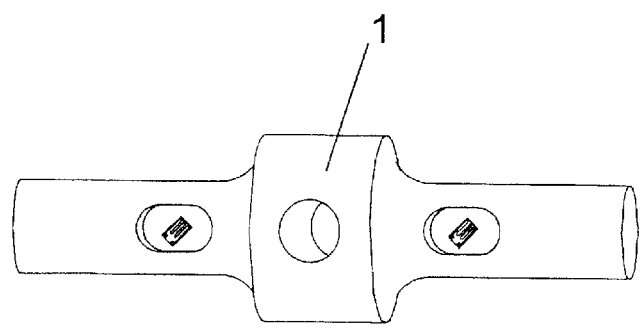
FIG. 43 is a perspective view showing the relative size of the shear-beam load cell of FIG. 8 and an alternative of equivalent force capacity but not incorporating the initial major material diminishments of FIG. 1.
Figure 43:
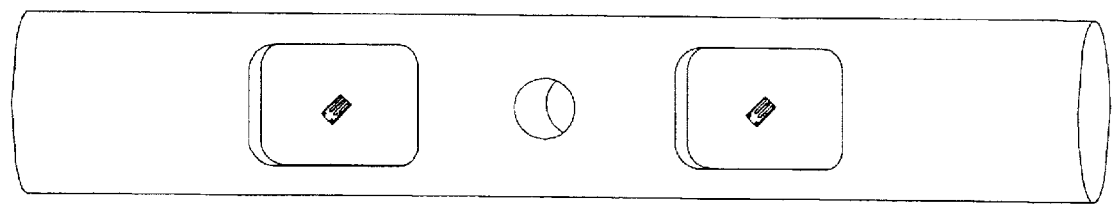

In FIG. 43, there is a perspective view showing the relative size of the shear-beam load cell of FIG. 8 and an alternative of equivalent force capacity but not incorporating the initial major material diminishments of FIG. 1.

Figure 44:
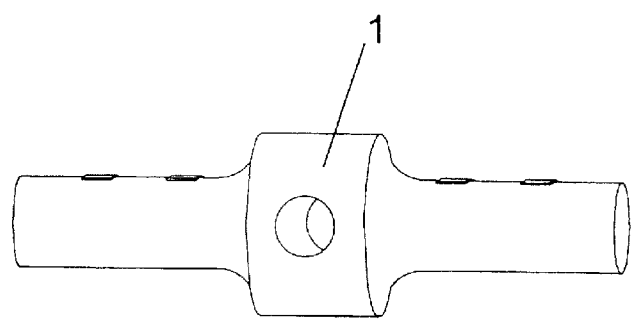
FIG. 44 is a perspective view showing the relative size of the differential-moment beam load cell of FIG. 9 and an alternative of equivalent force capacity but not incorporating the initial major material diminishments of FIG. 1.
Figure 44:
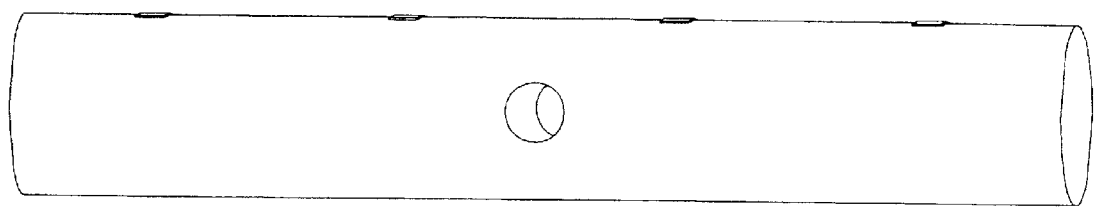

In FIG. 44, there is a perspective view showing the relative size of the differential-moment beam load cell of FIG. 9 and an alternative of equivalent force capacity but not incorporating the initial major material diminishments of FIG. 1.

Figure 45:
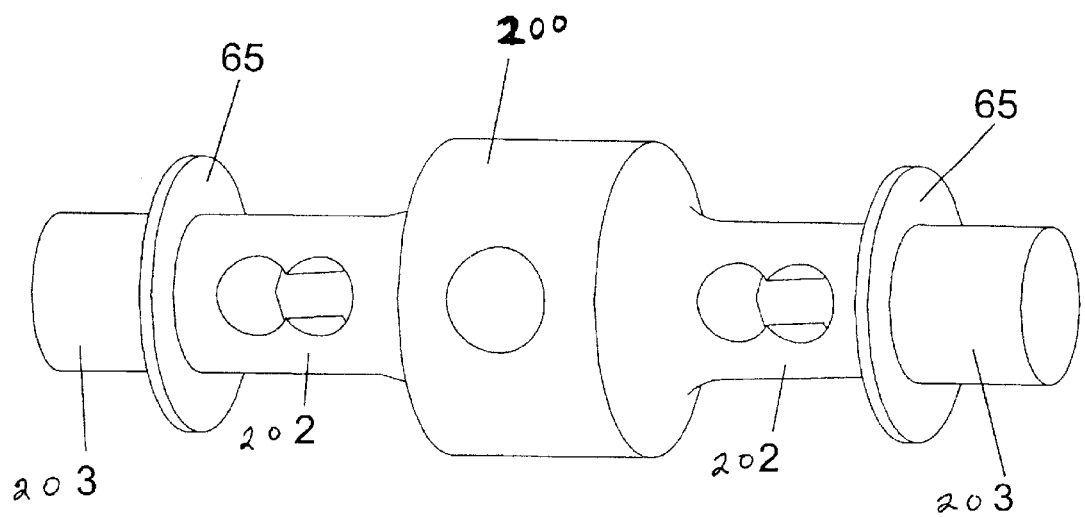
FIG. 45 is a perspective view of an alternate load cell with appendages left in during the machining process for sealing purposes.

In FIG. 45, there is a perspective view of an alternate load cell 200 with appendages 65 left in during the machining process for sealing purposes. The initial major material diminishments are made as per those in FIG. 1, but with material intentionally remaining in the inward regions of the end sections 203 to create washers 65, which are equivalent in function to washers 12 of FIG. 1 but are integral to the load cell body to eliminate the cost of the washers 12 and the welding joints which secure them to the end sections 203.

Figure 46:
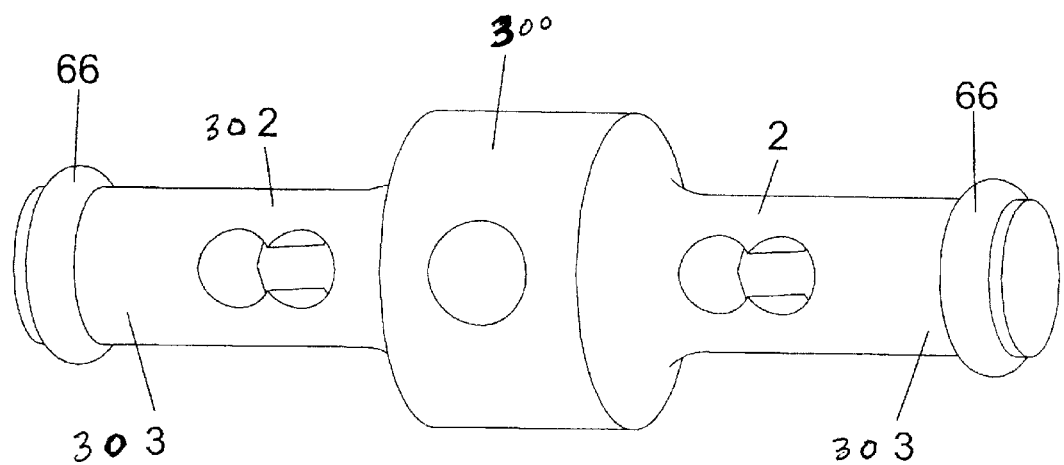
FIG. 46 is a perspective view of an alternate load cell with appendages left in during the machining process to provide more accurately positioned support contact points.

In FIG. 46, there is a perspective view of an alternate load cell 300 with appendages left in during the machining process to provide more accurately positioned support contact points. The initial major material diminishments are made as per those in FIG. 1, but with material intentionally remaining in the mid- or end-ward end regions of the end sections 303 to create convex protrusions 66, which allow the support points of contact between the protrusions 66 and the cups 8 of FIG. 1 to be in more accurately located positions. This ensures that any slight support point sensitivity of the load cell is factored by a better-fixed position of the support points.

Figure 47:
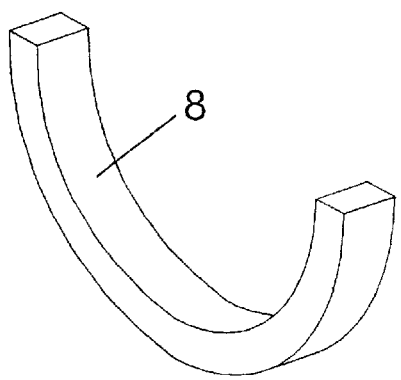
FIG. 47 is a perspective view of the mounting cups of FIG. 1.

In FIG. 47, there is a perspective view of the mounting cups 8 of FIG. 1. The cups 8 have rectangular cross-sections.

Figure 48:
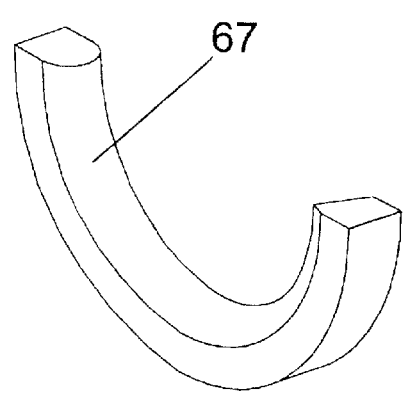
FIG. 48 is a perspective view of alternate mounting cups with a convex cross-section to provide more accurately positioned support contact points.

In FIG. 48, there is a perspective view of alternate mounting cups with a convex cross-section to provide more accurately positioned support contact points. The alternative to cup 8 of FIG. 1, being cup 67, is equivalent in function but is formed with an inner convex surface. This improves the accuracy of the position of the support points of contact between the cups 67 and the end sections 3 of FIG. 1. This ensures that any slight support point sensitivity of the load cell is factored by a better fixed position of the support points.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A load cell having a beam, the beam comprising:

two end sections for connecting to mountings to support the beam;

a load section having a bore hole through the beam, in a direction transverse to a long axis of the beam for capturing a pin for receiving a force to be measured; and at least one force-reacting section for measuring the force, wherein said load section has a substantially greater diameter than that of said at least one force-reacting section.

2. The load cell of claim 1 further comprising a pin through the bore for receiving the force to be measured.

3. The load cell of claim 2, further comprising a force receiving structure rotatably mounted on the pin for receiving the force such that the force receiving structure is freely rotatable around a longitudinal axis of the bore.

4. The load cell of claim 1, wherein the two end sections are for connection to mountings such that the beam is freely rotatable around a longitudinal axis of the beam.

5. The load cell according to claim 1, wherein said beam comprises a unitary piece.

6. A load cell comprising:

a beam, the beam having two end sections for connecting to mountings to support the beam, a load section having a hole through the beam, in a direction transverse to a long axis of the beam, for capturing a pin for receiving a force to be measured, and at least one force-reacting section for measuring the force, said load section having a substantially greater diameter than that of said at least one force-reacting section; and a pair of mountings at each end section of the beam, the mountings having supporting surfaces that are concentric to the longitudinal axis of the beam, the beam being freely rotatable within each mounting.

* * * * *